US010823444B2

(12) United States Patent
Van Eldik et al.

(10) Patent No.: US 10,823,444 B2
(45) Date of Patent: Nov. 3, 2020

(54) PRESSURE CONTROL DEVICE

(71) Applicant: Johnson Controls Technology Company, Auburn Hills, MI (US)

(72) Inventors: Hendrikus C. Van Eldik, Leeuwarden (NL); Nathan B. Emlen, Milwaukee, WI (US); John P. Patterson, Waukesha, WI (US); Philip L. Bushong, Franklin, WI (US); Troy L. Wert, Spring Grove, IL (US); Roy M. Rader, Fredonia, WI (US); Theodore J. Houck, III, Shorewood, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 261 days.

(21) Appl. No.: 15/897,483

(22) Filed: Feb. 15, 2018

(65) Prior Publication Data
US 2018/0283724 A1  Oct. 4, 2018

Related U.S. Application Data

(60) Provisional application No. 62/535,085, filed on Jul. 20, 2017, provisional application No. 62/480,154, filed on Mar. 31, 2017.

(51) Int. Cl.
*F24F 11/52* (2018.01)
*G05B 19/042* (2006.01)
(Continued)

(52) U.S. Cl.
CPC ............. *F24F 11/72* (2018.01); *F24F 11/52* (2018.01); *F24F 11/86* (2018.01); *F25B 49/02* (2013.01);
(Continued)

(58) Field of Classification Search
CPC .. F24F 11/52; F24F 11/72; F24F 11/86; F24F 11/88; F24F 2140/12; F25B 2341/06;
(Continued)

(56) References Cited

U.S. PATENT DOCUMENTS 4,537,038 A     8/1985  Alsenz et al.
6,102,665 A *   8/2000  Centers .................. F04B 49/10
                                                           417/17
(Continued)

FOREIGN PATENT DOCUMENTS

CN       106338168 A    1/2017
GB       2 039 386 A    1/1979
(Continued)

OTHER PUBLICATIONS

Danfoss, Data Sheet, Pressure Switch KP, cited as DKRCC.PD. CD0.A9.02, Sep. 2016, 10 pages.
(Continued)

*Primary Examiner* — Abdelmoniem I Elamin
(74) *Attorney, Agent, or Firm* — Foley & Lardner LLP

(57) ABSTRACT

A pressure control device for controlling a compressor includes a pressure sensor configured to measure pressure of a pressure line and a processing circuit. The processing circuit is configured to receive the measured pressure of the pressure line from the pressure sensor and control the compressor based on a set-point and the measured pressure. The pressure control device includes a mechanical switch sensitive to the pressure of the pressure line and configured to move between an open position and a closed position responsive to the pressure of the pressure line. Movement of the mechanical switch into one of the open position or the closed position causes the compressor to turn off and overrides the control of the compressor by the processing circuit.

20 Claims, 13 Drawing Sheets

(51) Int. Cl.
*F24F 11/72* (2018.01)
*F25B 49/02* (2006.01)
*F24F 11/86* (2018.01)
*F24F 11/88* (2018.01)
*F24F 140/12* (2018.01)

(52) U.S. Cl.
CPC .......... F25B 49/022 (2013.01); G05B 19/042 (2013.01); *F24F 11/88* (2018.01); *F24F 2140/12* (2018.01); *F25B 49/025* (2013.01); *F25B 2341/06* (2013.01); *F25B 2500/07* (2013.01); *F25B 2600/027* (2013.01); *F25B 2600/0251* (2013.01); *F25B 2600/2515* (2013.01); *F25B 2600/2517* (2013.01); *F25B 2600/2519* (2013.01); *F25B 2600/2525* (2013.01); *F25B 2700/19* (2013.01); *F25B 2700/193* (2013.01); *G05B 2219/2614* (2013.01)

(58) Field of Classification Search
CPC .......... F25B 2500/07; F25B 2600/0251; F25B 2600/027; F25B 2600/2515; F25B 2600/2517; F25B 2600/2519; F25B 2700/193; F25B 49/02; F25B 49/022; F25B 49/025; F25B 2600/2525; F25B 2700/19; G05B 19/042; G05B 2219/2614
See application file for complete search history.

(56) References Cited

U.S. PATENT DOCUMENTS

| | | | |
|---|---|---|---|
| 6,408,637 B1* | 6/2002 | Hanson | B01D 1/14 62/292 |
| 6,471,486 B1* | 10/2002 | Centers | F04B 49/10 417/17 |
| 6,622,500 B1* | 9/2003 | Archibald | B60H 1/3205 62/173 |
| 7,475,559 B2* | 1/2009 | Gleeson | B60H 1/00585 307/10.1 |
| 2007/0028635 A1* | 2/2007 | Gleeson | B60H 1/00585 62/239 |
| 2008/0083236 A1* | 4/2008 | Song | F25B 13/00 62/160 |
| 2010/0205989 A1* | 8/2010 | Creed | F25B 49/025 62/228.5 |
| 2014/0260381 A1* | 9/2014 | Marte | F25B 49/02 62/115 |
| 2015/0105919 A1* | 4/2015 | Chamorro | H01R 13/6456 700/276 |
| 2017/0240024 A1* | 8/2017 | Blatchley | B60H 1/00007 |
| 2018/0372384 A1* | 12/2018 | Taras | F25B 49/02 |

FOREIGN PATENT DOCUMENTS

| | | | |
|---|---|---|---|
| JP | 4278155 A | | 10/1992 |
| JP | 08-159624 | * | 6/1996 |
| JP | H08159624 | | 6/1996 |
| JP | H08240347 | | 9/1996 |
| JP | 2007-333370 A | | 12/2007 |

OTHER PUBLICATIONS

Search Report for European Application No. 18165008.6, dated Dec. 3, 2018, 12 pages.

Partial Search Report for European Application No. 18165008.6, dated Aug. 7, 2018, 16 pages.

* cited by examiner

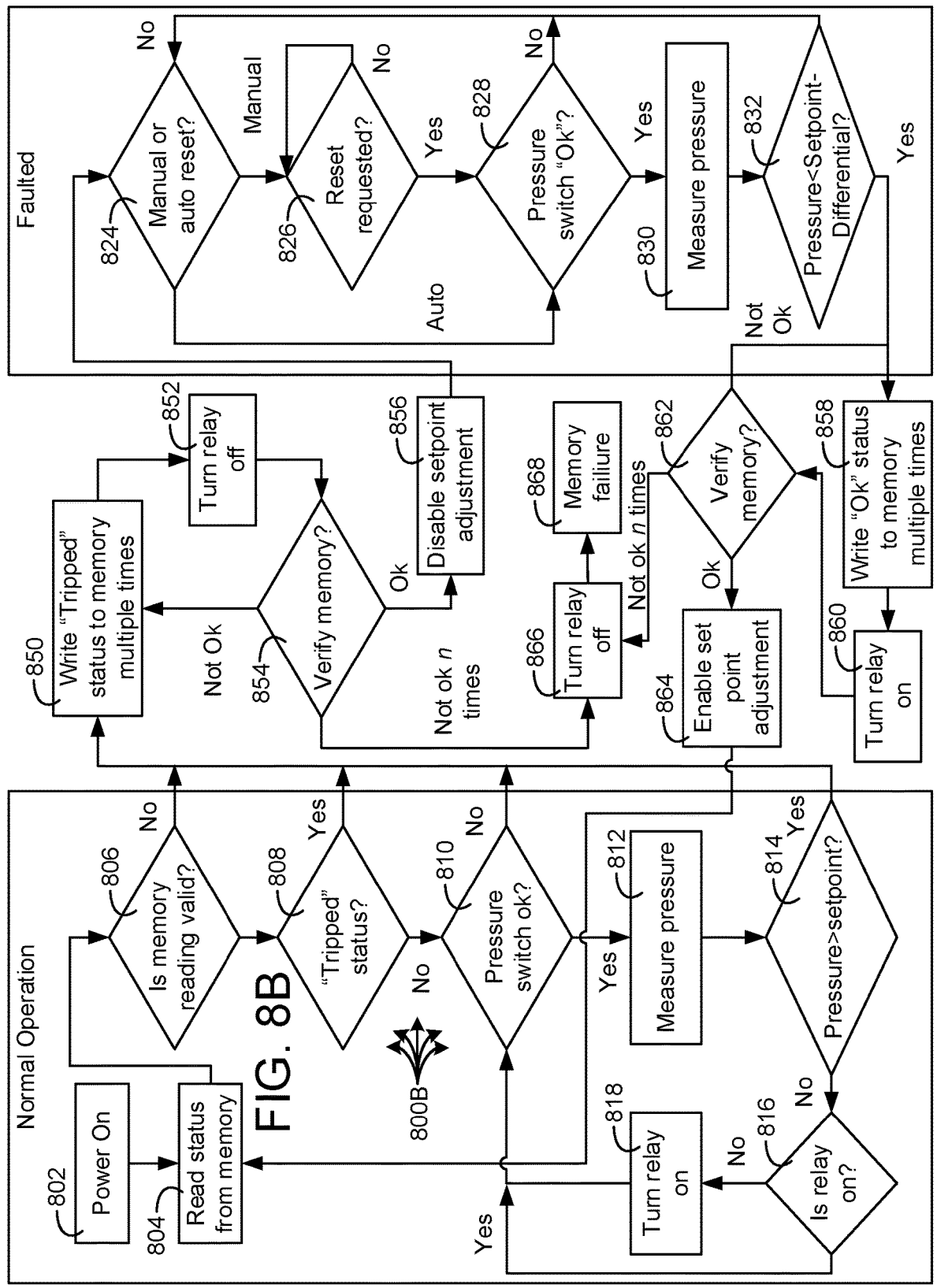

PRESSURE CONTROL DEVICE

CROSS-REFERENCE TO RELATED PATENT APPLICATIONS

This application claims the benefit of and priority to U.S. Provisional Patent Application No. 62/480,154 filed Mar. 31, 2017, and U.S. Provisional Patent Application No. 62/535,085 filed Jul. 20, 2017, the entireties of which are incorporated by reference herein.

BACKGROUND

The present disclosure relates generally to heating, ventilation, and air conditioning (HVAC) systems. The present disclosure relates more particularly to systems and methods for controlling compressors.

In a building, various HVAC systems cause the building to be heated or cooled. In some buildings, the HVAC systems heat or cool the building by evaporating and condensing refrigerant compressed by a compressor. Some pressure levels of the refrigerant adversely affect the HVAC system. For example, some pieces of building equipment or refrigerant conduits may not be able to withstand certain levels of refrigerant pressure. If the pressure of the refrigerant rises too high, the equipment itself may become damaged. In some cases, the systems that control the compressor may fail, allowing the pressure to rise too high. There may be no backup system for preventing damage when refrigerant pressure rises too high.

SUMMARY

One implementation of the present disclosure is a pressure control device for controlling a compressor. The pressure control device includes a pressure sensor configured to measure pressure of a pressure line and a processing circuit. The processing circuit is configured to receive the measured pressure of the pressure line from the pressure sensor and control the compressor based on a set-point and the measured pressure. The pressure control device includes a mechanical switch sensitive to the pressure of the pressure line and configured to move between an open position and a closed position responsive to the pressure of the pressure line. Movement of the mechanical switch into one of the open position or the closed position causes the compressor to turn off and overrides the control of the compressor by the processing circuit.

In some embodiments, the mechanical switch is configured to move into the open position or the closed position in response to the pressure of the pressure line exceeding a pressure threshold, thereby causing the compressor to turn off when the pressure of the pressure line exceeds the pressure threshold.

In some embodiments, the mechanical switch is configured to move into the open position or the closed position in response to the pressure of the pressure line being below a pressure threshold, thereby causing the compressor to turn on or turn off when the pressure of the pressure line is below the pressure threshold.

In some embodiments, the processing circuit is configured to determine whether the pressure of the pressure line exceeds a pressure threshold, determine whether the mechanical switch has moved into the open position or the closed position, and turn off the compressor in response to determining that the pressure of the pressure line exceeds the pressure threshold when the mechanical switch has failed to turn off the compressor.

In some embodiments, the pressure control device includes a pressure connector that connects the mechanical switch and the pressure sensor to the pressure line, where the pressure sensor is configured to measure the pressure of the pressure line via the pressure connector.

In some embodiments, the pressure control device includes a user interface configured to display information to a user and receive input from the user. The user interface can allow the user to enter a pressure set-point. In some embodiments, the user interface includes a display configured to display information to the user, where the processing circuit is configured to cause the display to display the measured pressure of the pressure line and an encoder positioned on a front surface of the pressure control device, the encoder is configured to receive the pressure set-point from the user.

In some embodiments, the pressure control device includes a user interface configured to display information to a user and receive input from the user, where the user interface allows the user to enter a pressure set-point. In some embodiments, the user interface includes a display configured to display information to the user, where the processing circuit is configured to cause the display to display the measured pressure of the pressure line. In some embodiments, the user interface includes multiple touch sensitive buttons positioned on a front surface of the pressure control device for receiving the input from the user.

In some embodiments, the processing circuit is configured to generate an analog voltage based on the measured pressure, where the value of the analog voltage is proportional to the measured pressure.

In some embodiments, the processing circuit is configured to determine whether the pressure control device is in a manual or auto reset mode. In some embodiments, in response to determining that the pressure control device is in the auto reset mode, the processing circuit is configured to determine whether the mechanical switch is tripped, where the mechanical switch trips in response to the pressure of the pressure line being above the pressure threshold, receive a second pressure measurement from the pressure sensor in response to determining that the mechanical switch is not tripped, determine whether the second pressure measurement is less than a set-point minus an offset in response to determining that the mechanical switch is not tripped, and turn the compressor on in response to determining the second pressure measurement is less than the set-point minus the offset.

In some embodiments, the processing circuit is configured to determine whether the pressure control device is in a manual or auto reset mode. In some embodiments, in response to determining that the pressure control device is in a manual reset mode, the processing circuit is configured to determine whether a user has requested a reset via a user interface, determine whether the mechanical switch is tripped in response to determining that the user has requested the reset, receive a second pressure measurement from the pressure sensor in response to determining that the mechanical switch is not tripped and that the user has requested the reset, determine whether the second pressure measurement is less than a set-point minus an offset in response to determining that the mechanical switch is not tripped and that the user has requested the reset, and turn the compressor on in response to determining the second pressure measurement is less than the set-point minus the offset.

In some embodiments, the pressure control device further includes a power relay configured to control a supply of power to the compressor. In some embodiments, the movement of the mechanical switch into the open position or the closed position actuates the power relay and interrupts the supply of power to the compressor.

In some embodiments, the mechanical switch includes a first switch terminal and a second switch terminal, the first switch terminal is connected to a relay output of the processing circuit and the second switch terminal is connected to a first relay terminal of the power relay. In some embodiments, the power relay includes the first relay terminal and a second relay terminal where the second relay terminal is grounded. In some embodiments, the processing circuit is configured to control the compressor based on a set-point and the measured pressure by turning the compressor on or off by setting the relay output to a high voltage or a low voltage, where when the pressure switch is in the closed position and the relay output is set to the high voltage, current flows through the pressure switch and the power relay causing the compressor to turn on.

In some embodiments, the mechanical switch includes a first switch terminal and a second switch terminal, the first switch terminal is grounded and the second switch terminal is connected to a first relay terminal of the power relay. In some embodiments, the power relay includes the first relay terminal and a second relay terminal, the second relay terminal is connected to a relay output of the processing circuit. In some embodiments, the processing circuit is configured to control the compressor based on a set-point and the measured pressure by turning the compressor on or off by setting the relay output to a high voltage or a low voltage. In some embodiments, when the pressure switch is in a closed position and the relay output is set to the high voltage, current flows through the pressure switch and the power relay causing the compressor to turn on.

Another implementation of the present disclosure is a method for controlling a compressor by a pressure control device. The method includes receiving, by a processing circuit of the pressure control device, a measured pressure of a pressure line, the measured pressure being a pressure of the pressure line measured by a pressure sensor of the pressure control device and controlling, by the processing circuit of the pressure control device, the compressor based on a set-point and the measured pressure. The method further includes causing, by a mechanical switch of the pressure control device, the compressor to turn off, where causing the compressor to turn off by the mechanical switch overrides the controlling of the compressor by the processing circuit. Causing, by the mechanical switch of the pressure control device, the compressor to turn off includes sensing, via the mechanical switch of the pressure control device, the pressure of the pressure line and moving, by the mechanical switch of the pressure control device, the mechanical switch between an open position and a closed position responsive to the pressure of the pressure line.

In some embodiments, moving, by the mechanical switch of the pressure control device, the mechanical switch between an open position and a closed position responsive to the pressure of the pressure line includes moving, by the mechanical switch of the pressure control device, the mechanical switch into the open position or the closed position in response to the pressure of the pressure line exceeding a pressure threshold, thereby causing the compressor to turn off when the pressure of the pressure line exceeds the pressure threshold.

In some embodiments, the method further includes determining, by the processing circuit of the pressure control device, whether the pressure of the pressure line exceeds a pressure threshold, determining, by the processing circuit of the pressure control device, whether the mechanical switch has moved into the open position or the closed position, and turning off the compressor, by the processing circuit of the pressure control device, in response to determining that the pressure of the pressure line exceeds the pressure threshold when the mechanical switch has failed to turn off the compressor.

In some embodiments, the method includes determining, by the processing circuit of the pressure control device, whether the pressure control device is in a manual or auto reset mode. In some embodiments, in response to determining that the pressure control device is in the auto reset mode, the method includes determining, by the processing circuit of the pressure control device, whether the mechanical switch is tripped, where the mechanical switch trips in response to the pressure of the pressure line being above the pressure threshold. In some embodiments, the method includes receiving, by the processing circuit of the pressure control device, a second pressure measurement from the pressure sensor in response to determining that the mechanical switch is not tripped, determining, by the processing circuit of the pressure control device, whether the second pressure measurement is less than a set-point minus an offset in response to determining that the mechanical switch is not tripped, turning, by the processing circuit of the pressure control device, the compressor on in response to determining the second pressure measurement is less than the set-point minus the offset.

In some embodiments, the method further includes determining, by the processing circuit of the pressure control device, whether the pressure control device is in a manual or auto reset mode. In some embodiments, in response to determining that the pressure control device is in a manual reset mode, the method includes determining, by the processing circuit of the pressure control device, whether a user has requested a reset via a user interface, determining, by the processing circuit of the pressure control device, whether the mechanical switch is tripped in response to determining that the user has requested the reset, receiving, by the processing circuit of the pressure control device, a second pressure measurement from the pressure sensor in response to determining that the mechanical switch is not tripped and that the user has requested the reset, determining, by the processing circuit of the pressure control device, whether the second pressure measurement is less than a set-point minus an offset in response to determining that the mechanical switch is not tripped and that the user has requested the reset, and turning the compressor on, by the processing circuit of the pressure control device, in response to determining the second pressure measurement is less than the set-point minus the offset.

Another implementation of the present disclosure is a pressure control system for controlling a compressor. The pressure control system includes a pressure sensor configured to measure pressure of a pressure line and a processing circuit. The processing circuit is configured to receive the measured pressure of the pressure line from the pressure sensor and control the compressor based on a set-point and the measured pressure. The pressure control system includes a mechanical switch sensitive to the pressure of the pressure line and configured to move between an open position and a closed position responsive to the pressure of the pressure line. Movement of the mechanical switch into one of the open position or the closed position causes the compressor to turn off and overrides the control of the compressor by the processing circuit, where the mechanical switch is configured to move into the open position or the closed position in response to the pressure of the pressure line exceeding a pressure threshold, thereby causing the compressor to turn off when the pressure of the pressure line exceeds the pressure threshold.

In some embodiments, the mechanical switch includes a first switch terminal and a second switch terminal. In some embodiments, the first switch terminal is grounded and the second switch terminal is connected to a first relay terminal of a power relay. In some embodiments, power relay includes the first relay terminal and a second relay terminal, where the second relay terminal is connected to a relay output of the processing circuit. In some embodiments, the processing circuit is configured to control the compressor based on a set-point and the measured pressure by turning the compressor on or off by setting the relay output to a high voltage or a low voltage, where when the pressure switch is in a closed position and the relay output is set to the high voltage, current flows through the pressure switch and the power relay causing the compressor to turn on.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 8B is a flow diagram of a process for operating the pressure control device of FIG. 7A to turn the compressor on and off and further determine whether the memory of the pressure control device of FIG. 7A is functional, according to an exemplary embodiment.

DETAILED DESCRIPTION

Overview

Figure 1:
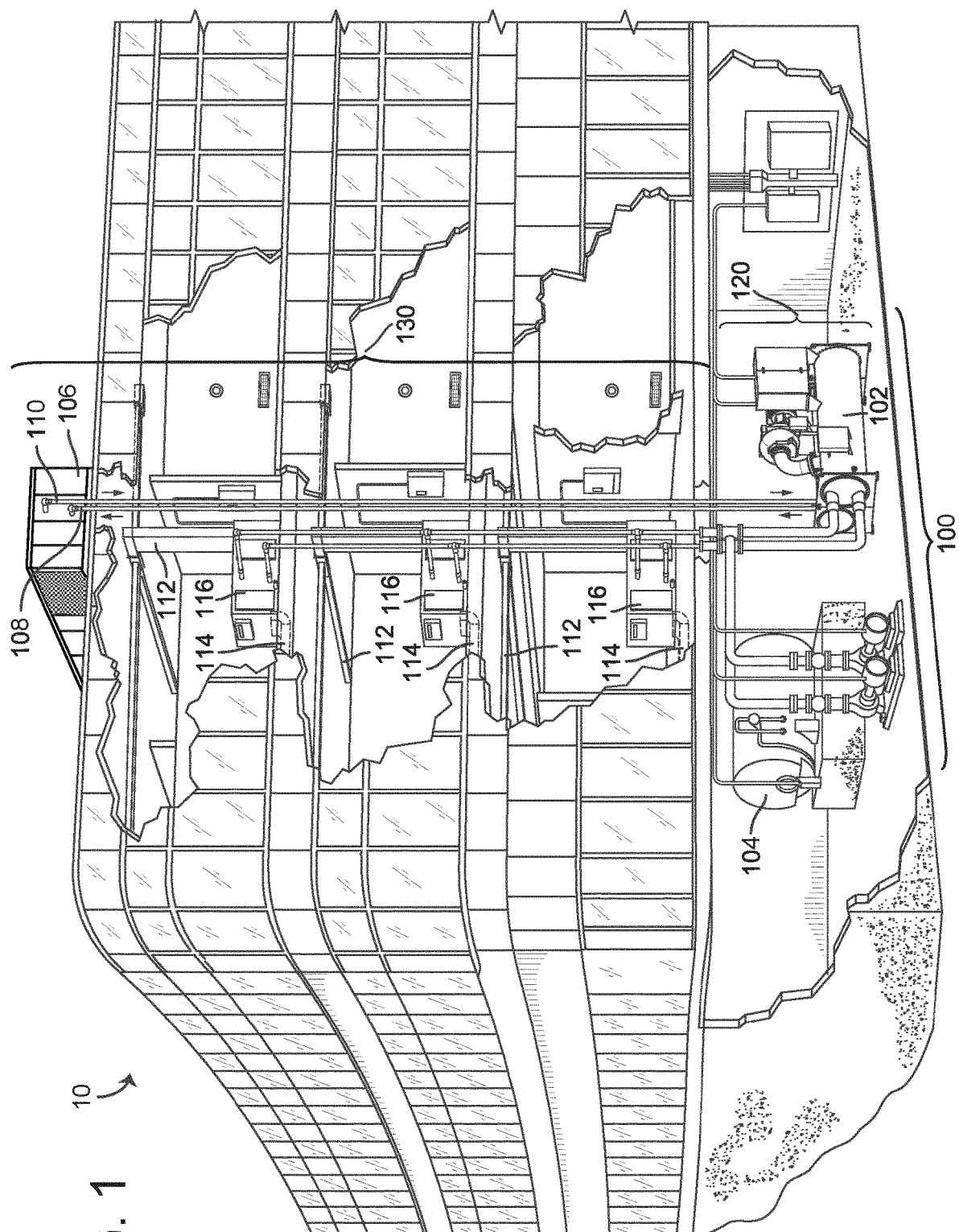
FIG. 1 is a drawing of a building equipped with a HVAC system, according to an exemplary embodiment.

Referring generally to the FIGURES, a pressure control device with a mechanical pressure switch and an electronic pressure sensor are shown, according to various exemplary embodiments. The pressure control device may be suitable for use in refrigeration systems where a compressor may change the pressure level of refrigerant (e.g., HFC/R920) in a conduit. The pressure control device can be used for in any system and/or application wherein a compressor or another device needs to be operated based on a pressure level of refrigerant and/or any other fluid or gas (e.g., carbon dioxide ($CO_2$)). This disclosure generally refers to using the pressure control device to control a pressure level of refrigerant but it should be understood that the applications of the pressure control device described herein are not limited to refrigerant.

The pressure control device can perform both mechanical and software based control of the compressor to control a refrigerant pressure level. The pressure control device can be configured to use the pressure sensor, an on board pressure transducer, to perform set-point based pressure control. Furthermore, the mechanical pressure switch can utilized by the pressure control device for high or low pressure safety. More specifically, using the mechanical pressure switch to control a compressor to stop pressure from rising above a maximum level or falling below a minimum level.

In some embodiments, the pressure control device is part of a permanent installation where a compressor needs to be constantly monitored. In some embodiments, the pressure control device is a portable technician tool for installation when a technician requires a compressor to be monitored while the technician performs maintenance. The pressure control device may support use in high pressure cut-out/cut-in applications and in low pressure cut-out/cut-in applications. By combining multiple functions into a single pressure control device i.e., combining digital set-point control of pressure, including a mechanical safety feature (the mechanical pressure switch), and further including user interface capabilities, space can be saved since multiple devices are not needed, only the single pressure control device.

The pressure control device may include the mechanical pressure switch as a safety precaution to supplement the electronic pressure sensor (e.g., a pressure transducer) used by the pressure control device to perform control functionalities. The pressure control device may combine both the mechanical pressure switch and the electronic pressure transducer into a single implementation that is impervious to digital or mechanical failure. The pressure control device may be use the electronic pressure transducer to cause a compressor to be turned on or off to cause a refrigerant pressure to be at or near a particular set-point. This may prevent the compressor from causing the pressure of the refrigerant from becoming dangerously high or dangerously low. Even if the mechanical pressure switch fails, the pressure control device can continue to operate the compressor based on pressure readings of the pressure sensor. In some embodiments, the cutout threshold of the mechanical switch is higher than the cutout threshold of the digital system when the pressure control device operates to cause the compressor to turn off in response to the pressure rising to high. Similarly, in some embodiments, the threshold of the mechanical switch is lower than the threshold of the digital system when the pressure control device is configured to operate to cause the compressor to turn off in response to the pressure falling to low.

The mechanical pressure switch may be a backup precaution in case the pressure sensor or a processing circuitry which operates based on pressure measurements of the pressure sensor fail. The mechanical pressure switch may be mechanically actuated, i.e., the switch opens or closes based on the pressure of the refrigerant. Even if one or both of the pressure sensor and the processing circuit fail, the mechanically actuated pressure switch can prevent a pressure level of a refrigeration system from rising above or falling below an unsafe level.

In some embodiments, the built in redundancy of the pressure control device via the pressure sensor and the mechanical pressure switch previously described, make the pressure sensor suitable for Pressure Equipment Directive (PED) applications. PED applications may be various standards for the design and/or fabrication of pressure equipment (e.g., the pressure control device). The pressure control device may meet the PED EN 12263 directive with a pressure switch (PSH), a pressure switch with an external reset (PZH), and a pressure switch with an internal reset (PZHH). The pressure control device may meet the PED EN 12263 directive due to the fact that both the mechanical switch and/or a processing circuit can turn off a compressor when a pressure level of refrigerant is above a predefined amount. For example, the pressure control device may deactivate the compressor when the mechanical pressure switch has been tripped and/or when a software threshold has been tripped as determined by the processing circuit via the pressure sensor.

During abnormal pressure situations (e.g., sensed pressure being above or below a particular pressure set-point), the pressure control device can keep track of how often these events occur and/or how many times they occur (e.g., how many times within a predefined period of time) and can ignore a particular number and/or particular frequency of the abnormal pressure occurrences before triggering a fault condition and/or shutting the system down. In some embodiments, the particular number of abnormal pressure occurrences may be set via an interface (e.g., the LED display, rotary encoder, button input, etc.).

As previously mentioned, in some embodiments, the pressure control device includes a user interface. The user interface may include a touch screen, one or more buttons, a dial, a rotary encoder, etc., or any combination thereof. A rotary encoder may be attached to a knob (protective cap) that protrudes from the enclosure of the pressure control device (e.g., on the front surface of the device, on the upper right hand corner of the pressure control device, etc.). A user may setup the pressure control device via the knob attached to the rotary encoder. In some embodiments, the encoder is used to navigate through various set up menus that the pressure control device may display on the LED display.
Building Management System and HVAC System Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Figure 2:
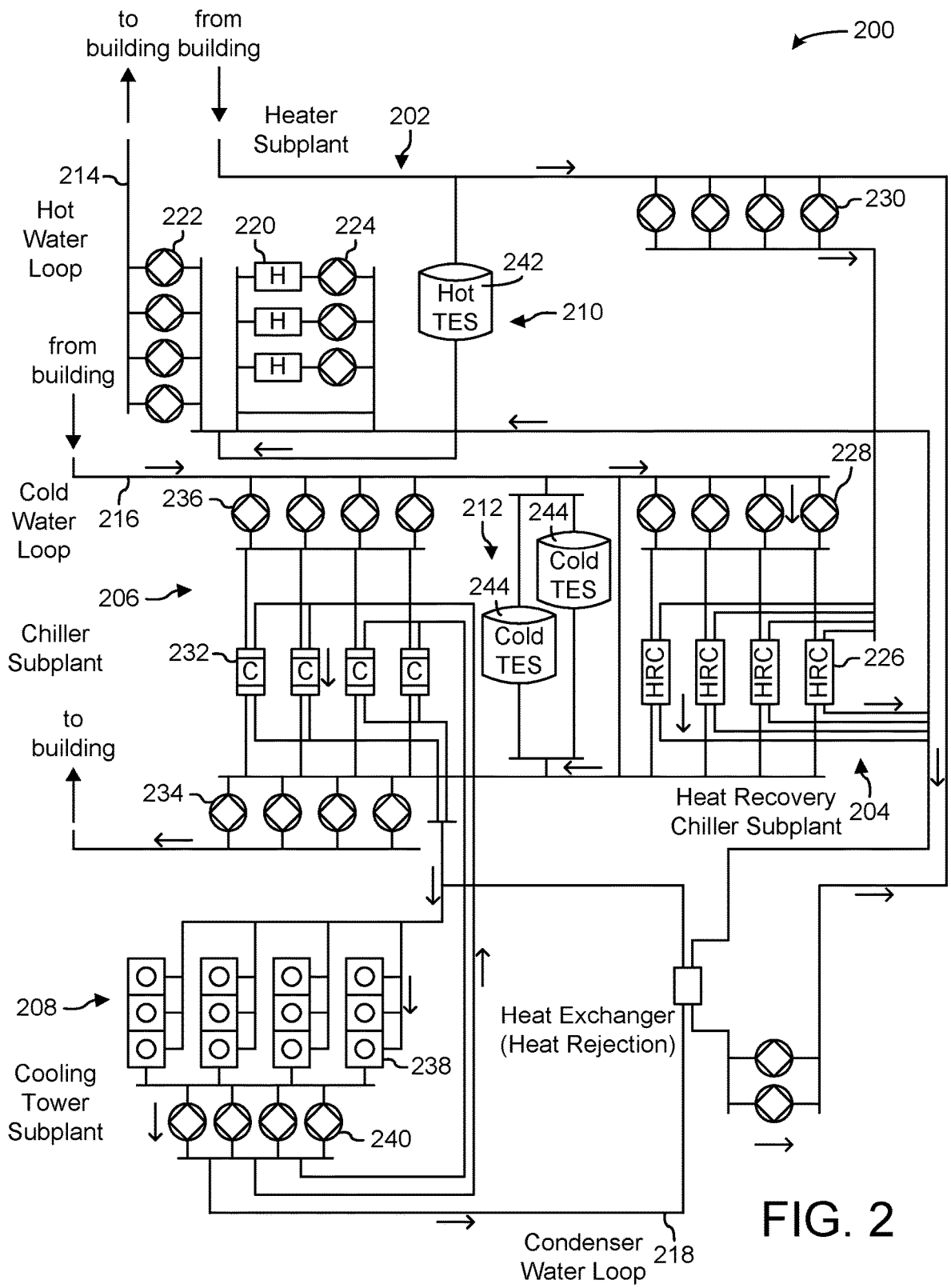
FIG. 2 is a block diagram of a waterside system that may be used in conjunction with the building of FIG. 1, according to an exemplary embodiment.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
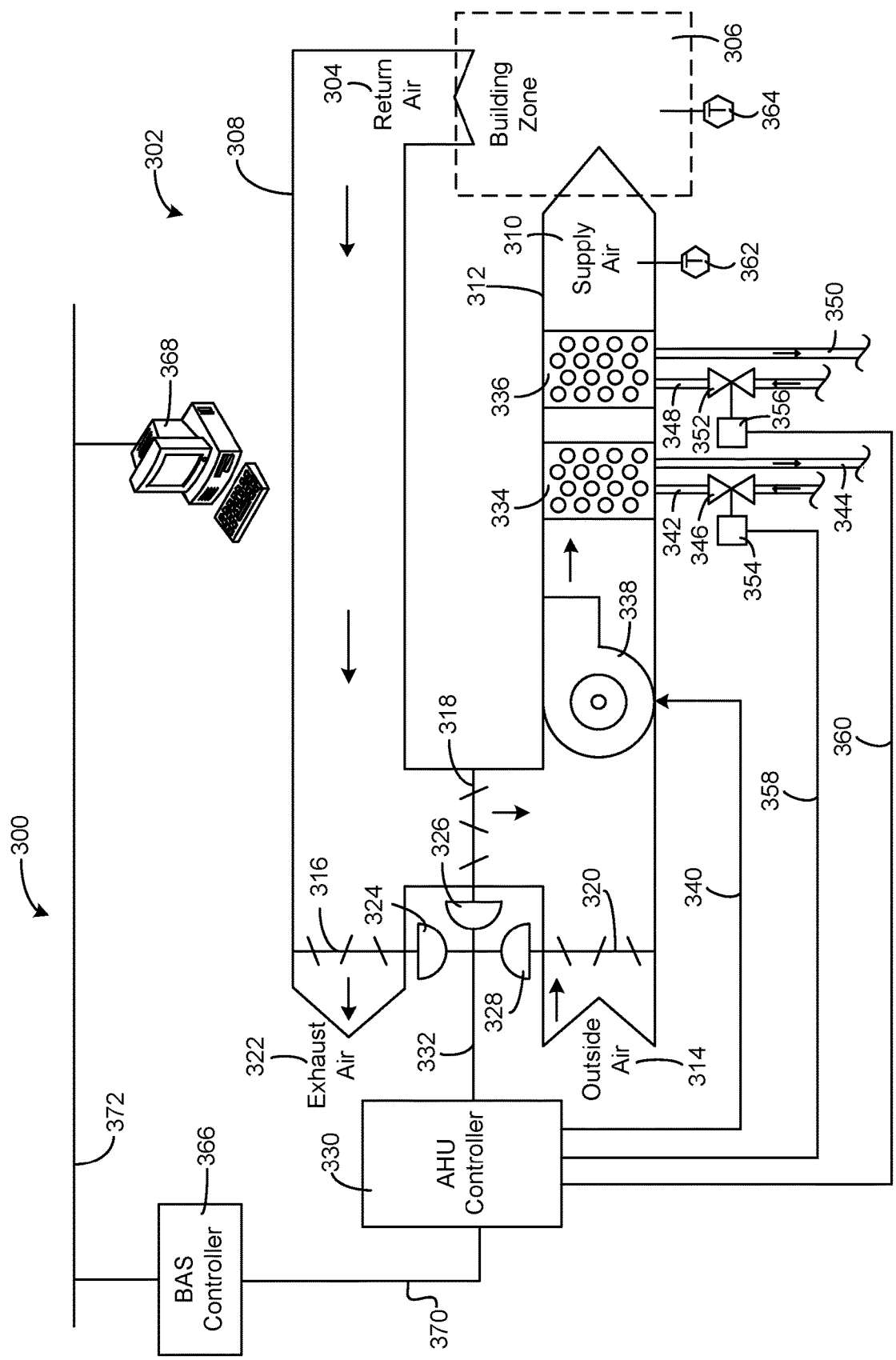
FIG. 3 is a block diagram of an airside system that may be used in conjunction with the building of FIG. 1, according to an exemplary embodiment.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, set-points, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Pressure Control Device

Referring generally to FIGS. 4-6B, a pressure control device is shown according to various exemplary embodiments. The pressure control device may include a circuit board with various electrical components (e.g., relays, switches, transducers, microcontrollers, memory devices, etc.). The various electrical components may be housed within an enclosure. The pressure control device may include a pressure port (e.g., conduit connectors) for connecting to a refrigeration system. The enclosure may also include openings for allowing signal wiring between the refrigeration system and the pressure control device.

The pressure control device may include a display and user input interface. In some embodiments, the display is a touchscreen, a holographic display, an light emitting diode (LED) display, and/or any other display. An LED display of the pressure control device may include several (e.g., four) LED characters. The LEDs of the LED display may illuminate to display information including a current pressure measured, a pressure set-point, a fault message, etc. The pressure control device may illuminate the LED display to display pressure values in various units (bar, PSI, etc.). The LED display may further include LED icons, a "BAR" icon and a "PSI" icon, the icons may be illuminated to shine through a faceplate of a cover of the enclosure based on selected units for the pressure control (e.g., BAR or PSI).

Figure 4:
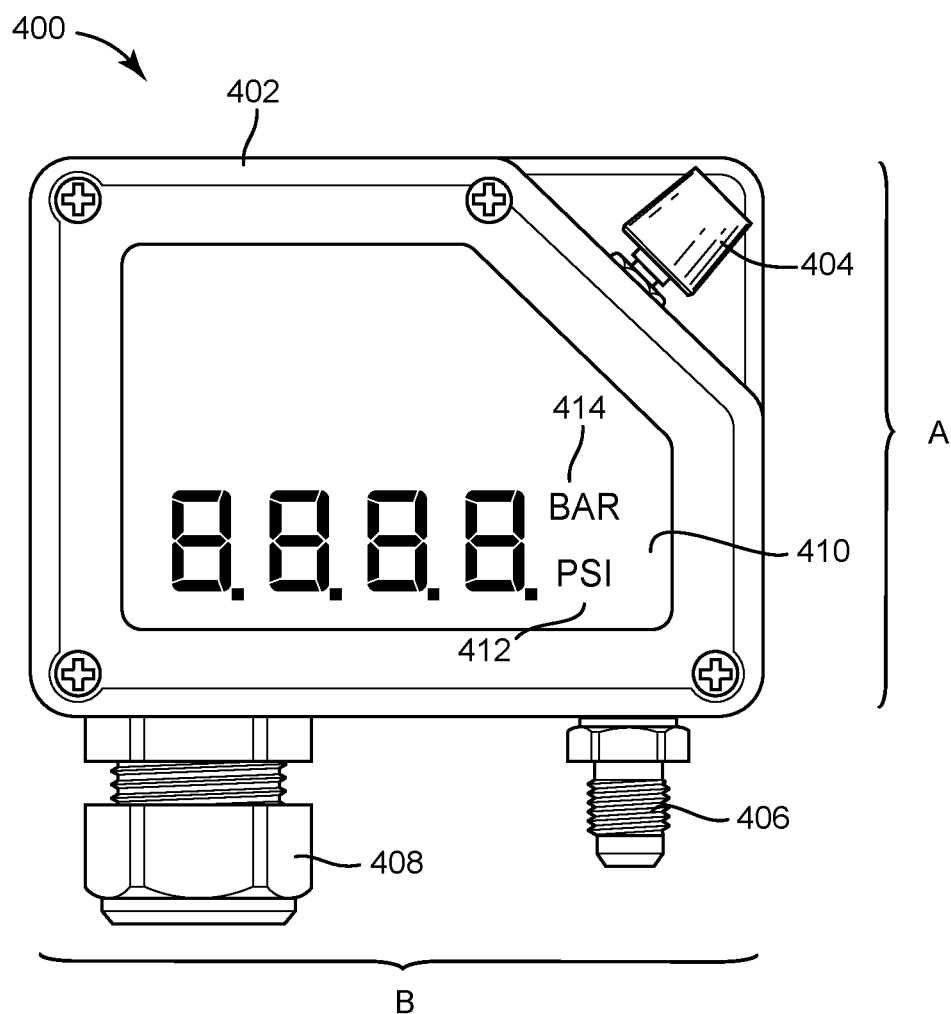
FIG. 4 is a diagram of a pressure control device that includes a mechanical pressure switch and an electronic pressure sensor, according to an exemplary embodiment.

Referring more particularly to FIG. 4, a pressure control device 400 is shown, according to an exemplary embodiment. The pressure control device 400 may provide pressure control of a compressor. The pressure control device 400 may operate in pressure ranges up to 140 bar or beyond. In some embodiments, pressure control device 400 is configured to measure a high side pressure and may have a proof pressure (pressure limit) of 160 Bar (2321 PSIG). The pressure control device 400 may have a maximum high cut out pressure of 140 BAR (2030 PSIG). In some embodiments, a processing circuit and a pressure sensor implement the high cut out pressure while a mechanical pressure switch implements the proof pressure. In some embodiments, pressure control device 400 is configured to measure a low side pressure and may have low proof pressure of 100 BAR (1450 PSIG).

The height and width of the pressure control device 400 is shown by dimension markers A and B respectively. Dimension A may be on the order of inches, e.g., between three inches and ten inches. The dimension B may also be on the order of inches and may also be between three inches and ten inches. In some embodiments, the dimension B is greater than the dimension A. Furthermore, the depth of the pressure control device 400 may be on the order of inches, e.g., approximately two to three inches although the depth may be anywhere on the order of three inches to ten inches.

The pressure control device 400 is shown to include an enclosure 402. The enclosure may be configured, structured, and made out of material suitable for industrial use. The enclosure may enclose one or more processing circuits, circuit boards, mechanical components, and/or any other component or device of the pressure control device 400. The pressure control device 400 is shown to include an encoder 404. The encoder 404 may be a rotary encoder with a knob. In various embodiments, the encoder 404 is a potentiometer and/or any other twistable device for generating an input for the pressure control device 400. The encoder 404 may allow a user to set a pressure set-point (e.g., a set-point accurate to a predefined number of decimal points), select display units, change various operating parameters, set a fault number limit (e.g., number of faults that must occur before displaying an error and/or shutting down), view historical data (e.g., historical pressure data, faults, etc.), etc.

The pressure control device 400 is further shown to include a display 410. The display 410 may include one or more LED numerical outputs and/or one or more LED icons, may be a touch screen, an LCD display, an LED display, etc. The LEDs may be bright enough for viewing during the day. In FIG. 4, there are four LED numerical outputs for the display 410. The pressure control device 400 may illuminate the four icons to display various text and/or numerical value (e.g., integer, decimal, hexadecimal, etc.) outputs to a user. The outputs may be text which indicate menus, menu settings, fault codes, etc. The outputs may further indicate pressures, pressure set-points, and/or any other numerical value or operating parameter.

There may be a single LED behind a transparent section of the enclosure 402 which illuminates the transparent section. The transparent section may be cut into the shape of an icon and may be transparent such that when the LED is turned on, the icon will be illuminated. The "BAR" icon 414 may be illuminated when the LED display is displaying pressure values with units of BAR while the LED display may illuminate the "PSI" icon 412 when the LED display is displaying pressure values with units of PSI. During normal operation, the LED display may display the actual refrigerant pressure in the refrigeration system. During a fault condition, the LED display may display one or more alarm messages.

The pressure control device 400 is shown to include a pressure input 406. The pressure input 406 may allow for a pressure line of a refrigeration system to be connected to the pressure control device 400. The pressure input 406 may be any kind of pressure port. The pressure input 406 may be a pressure input that the pressure control device 400 monitors via a pressure sensor and/or mechanical switch. The pressure sensor may be any electrical and/or mechanical pressure transducer that can measure pressure via the pressure input 406.

The pressure control device 400 can include a pressure switch coupled to the pressure input 406. The pressure switch may be a mechanical pressure switch (e.g., a mechanically actuated pressure switch). The pressure control device 400 may use the pressure switch to control a relay to enable or disable a compressor based on the pressure of a pressure conduit connected to the pressure control device 400 via the pressure input 406. In this regard, the pressure switch may be a trip switch. For example, if the pressure exceeds a predefined amount, the pressure switch can cause a compressor to be turned off via the relay. Similarly, if the pressure is less than a predefined amount, the pressure switch can cause the compressor to be turned on and/or turned off via the relay.

The pressure control device 400 is further shown to include a wiring input/output 408. The wiring input/output 408 may allow for connecting various wires to the pressure control device 400 and/or connect wires from the pressure control device 400 to an external system (e.g., a refrigeration system, a power supply, an external controller, etc.). In some embodiments, the wiring is for analog inputs/outputs, digital inputs/outputs, power, control wires for a compressor, communication wires, and/or any other input, output, or signal that can be connected to the pressure control device 400.

The pressure control device 400 may generate a compressor enable output and communicate the compressor enable output to a compressor via a wire connected to the pressure control device via the wiring input/output 408. A "enabling the compressor" may refer to turning on a compressor or otherwise enabling the compressor to turn itself on. For example, a compressor may turn on, off, or adjust its speed in order to maintain a particular pressure. However, the compressor may only be able to turn on and/or adjust its speed only when the pressure control device 400 enables the compressor to do so. Therefore, "turning a compressor on" and "enabling a compressor" may be used interchangeably herein and may refer to allowing a compressor to turn on or actually causing the compressor to turn on.

In some embodiment, the compressor enable output is a signal that causes a compressor of a refrigeration system to turn on and/or turn off. The compressor enable output may include one or more wires that are connected to a compressor and/or compressor controller via wiring input/output 408. In some embodiments, a microcontroller of the pressure control device 400 generates a control signal and provides the control signal to control a relay coupled to control wires of the compressor. The control signal can cause the relay to either enable the compressor and/or disable the compressor (e.g., turn the compressor on or off). This functionality is described with further reference to FIGS. 7C-7D.

Figure 5A:
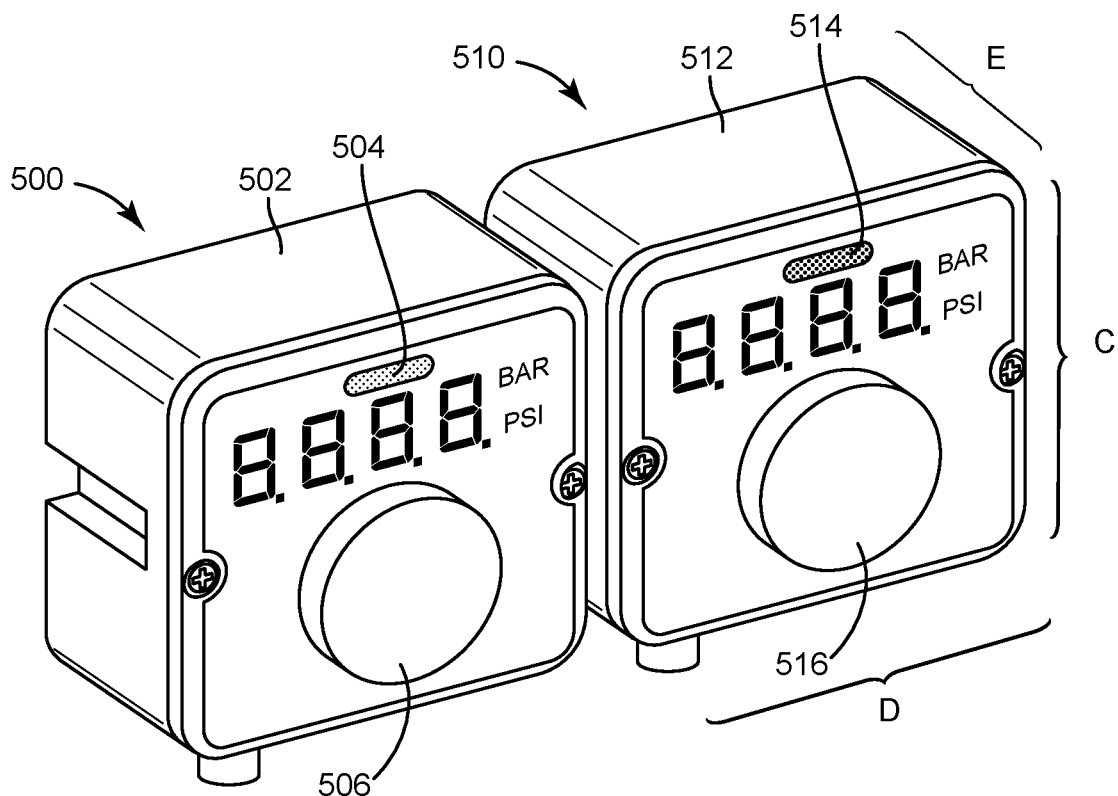
FIGS. 5A and 5B are diagrams of pressure control devices that include a rotary encoder, according to an exemplary embodiment.
Figure 5B:
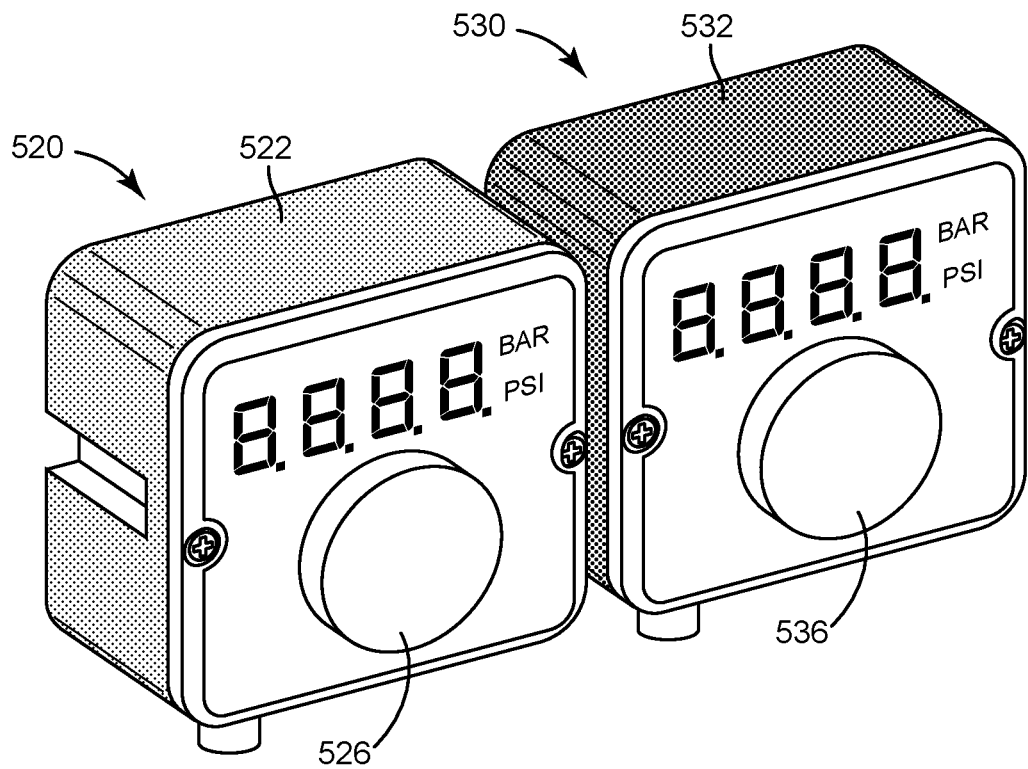

Referring more particularly to FIGS. 5A and 5B, pressure control devices 500, 510, 520, and 530 that include encoders are shown, according to an exemplary embodiment. The pressure control devices 500, 510, 520, and 530 may be similar to the pressure control device 400 as described reference to FIG. 4.

The pressure control devices 500, 510, 520, and 530 are each shown to include an enclosure, i.e., the enclosures 502, 512, 522, and 532. The enclosures 502, 512, 522, and 532 may be the same or similar to the enclosure 402 as described with reference to FIG. 4. The pressure control devices 500, 510, 520, and 530 of FIGS. 5A-5B are shown to include encoders 506, 516, 526, and 536. The encoders 506, 516, 526, and 536 are shown to be located on the faces of the pressure control devices 500, 510, 520, and 530 and may be the same as and/or similar to the encoder 404 as described with reference to FIG. 4.

The pressure control device 510 is shown to be marked with dimensions D, C, and E. These dimensions may define the width, height, and depth of the pressure control device 510. The dimensions D and C may be the same, i.e., the front surface of the pressure control device 510 may be a square. Furthermore, the dimensions D, C, and E may be the same, i.e., the pressure control device 510 may form a cube. However, the dimensions D, C, and/or E may be different and thus the shape of the pressure control device 510 may be a rectangular solid. The dimensions D, C, and E may be on the order of inches. For example, the dimensions D, C, and E may be on the order of 2 inches to 10 inches. For example, in some embodiments, the dimensions of the pressure control device 510 are six inches by six inches by three inches. The pressure control devices 500, 520, and/or 530 may have dimensions the same as and/or similar to the dimensions of the pressure control device 510.

In some implementations, the pressure control devices 500 and 520 are configured to control pressure of a refrigerant conduit to a particular set-point and further prevent the pressure from rising above a predefined amount. As described elsewhere herein, the pressure control devices 500 and 520 may include a processing circuit and a pressure sensor that prevents the pressure from rising above the predefined amount and/or also includes a mechanical pressure switch that actuates to cause a compressor to be turned off in response to the pressure rising to or above the predefined amount. The pressure control devices 502 and 520 may include a high pressure indicator 504 that notifies a user that pressure has risen to or above the predefined amount.

Since the pressure control device 520 may perform high pressure cutout, the enclosure 522 of the pressure control device 520 may be colored a first particular color. In some implementations, the color is red signifying high pressure cutout. However, any color (red, blue, black, green, pink, orange, purple, etc.) can be used to denote high pressure cutout.

In some implementations, the pressure control devices 510 and 530 are configured to control pressure of the refrigerant conduit to the particular set-point and further prevent the pressure from falling below the predefined amount. As described elsewhere herein, the pressure control devices 510 and 530 may include a processing circuit that prevents the pressure from falling below the predefined amount and/or also includes a mechanical pressure switch that actuates to cause a compressor to be turned on and/or off in response to the pressure falling to or below the predefined amount. The pressure control devices 510 and 530 may include a low pressure indicator 514 that notifies a user that pressure has fallen to or below the predefined amount.

Since the pressure control device 530 may perform low pressure cutout, the enclosure 532 of the pressure control device 530 may be colored a second particular color. In some implementations, the color is blue signifying low pressure cutout. However, any color (red, blue, black, green, pink, orange, purple, etc.) can be used to denote high pressure cutout.

Figure 6A:
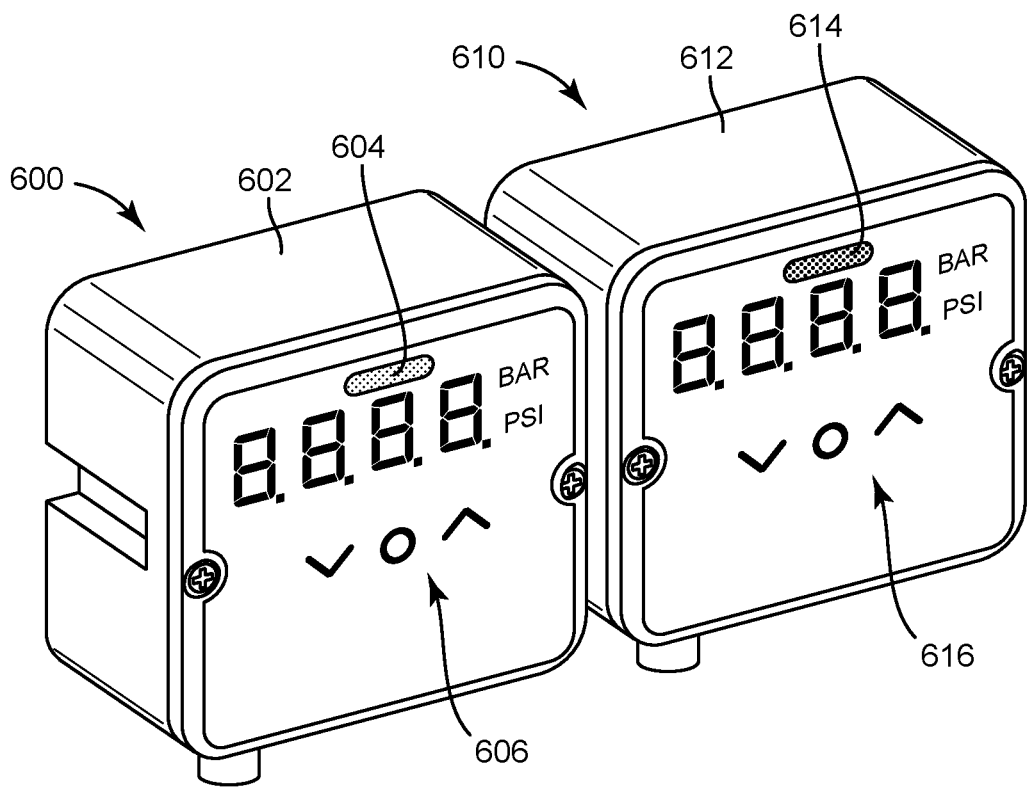
FIGS. 6A and 6B are diagrams of a pressure control device that include buttons, according to an exemplary embodiment.
Figure 6B:
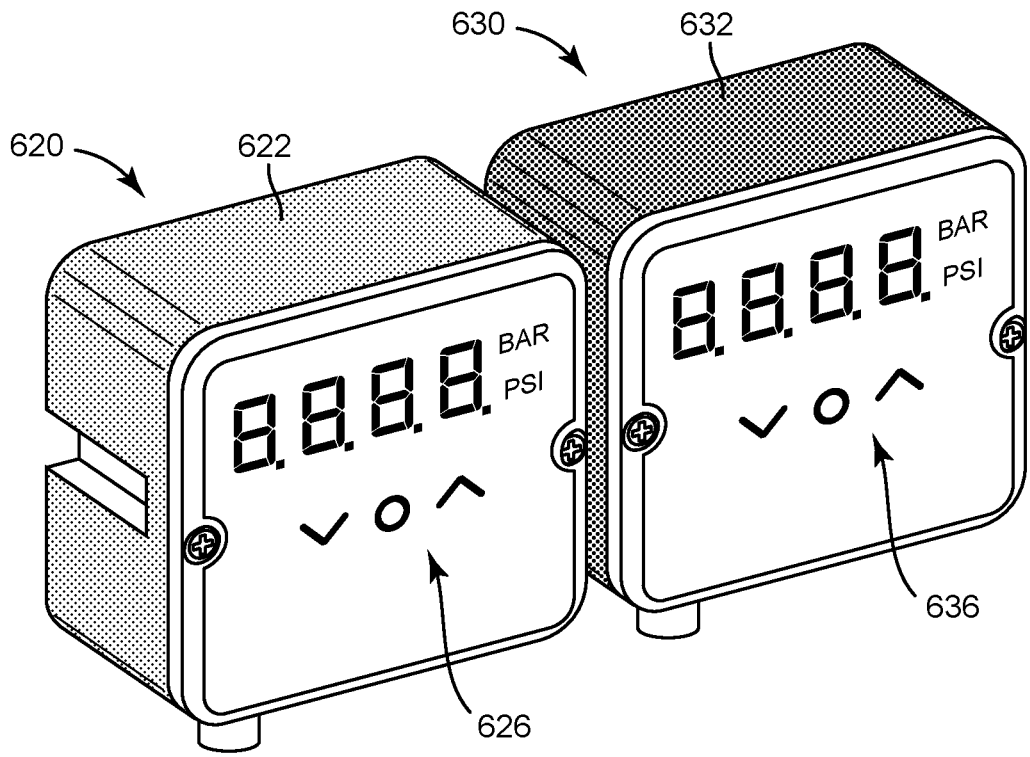

Referring now to FIGS. 6A and 6B, pressure control devices 600, 610, 620, and 630 are shown including input buttons, according to an exemplary embodiment. The pressure control devices 600, 610, 620, and 630 may be similar to the pressure control devices 500, 510, 520, and 530 as described with reference to FIGS. 5A-5B and may further be similar to the pressure control device 400 as described with reference to FIG. 4.

The pressure control devices 600, 610, 620, and 630 are each shown to include an enclosure, i.e., the enclosures 602, 612, 622, and 632. The enclosures 602, 612, 622, and 632 may be the same or similar to the enclosure 402 as described with reference to FIG. 4 and/or the enclosures 502, 512, 522, and 532 as described with reference to FIGS. 5A-5B. Furthermore, the pressure control devices 600, 610, 620, and/or 630 may have the same or similar dimensions as the pressure control devices of FIGS. 5A-5B.

The pressure control devices 600, 610, 620, and 630 of FIGS. 6A-6B include input buttons 606, 616, 626, and 636. The input buttons 606, 616, 626, and 636 are shown to be located on the front faces of the pressure control devices 600, 610, 620, and 630. The input buttons 606, 616, 626, and 636 can be physical buttons or touch buttons. For example, the touch buttons (e.g., resistive touch buttons, capacitive touch buttons, etc.) may be flush with the face of the pressure control devices 600, 610, 620, and 630 to be aesthetically pleasing to a user.

In some implementations, the pressure control devices 600 and 620 are configured to control pressure of a refrigerant conduit to a particular set-point and further prevent the pressure from rising above a predefined amount. As described elsewhere herein, the pressure control devices 600 and 620 may include a processing circuit that prevents the pressure from rising above the predefined amount and/or also includes a mechanical pressure switch that actuates to cause a compressor to be turned off in response to the pressure rising to or above the predefined amount. The pressure control devices 600 and 620 may include a high pressure indicator 604 that notifies the user that pressure has risen to or above the predefined amount.

Since the pressure control device 620 may perform high pressure cutout, the enclosure 622 of the pressure control device 620 may be colored a first particular color. In some implementations, the color is red signifying high pressure cutout. However, any color (red, blue, black, green, pink, orange, purple, etc.) can be used to denote high pressure cutout.

In some implementations, the pressure control devices 610 and 630 are also configured to control pressure of the refrigerant conduit to the particular set-point and further prevent the pressure from falling below the predefined amount. As described elsewhere herein, the pressure control devices 610 and 630 may include a processing circuit that prevents the pressure from falling below the predefined amount and/or also includes a mechanical pressure switch that actuates to cause a compressor to be turned on and/or off in response to the pressure falling to or below the predefined amount. The pressure control devices 610 and 630 may include a low pressure indicator 614 that notifies a user that pressure has fallen to or below the predefined amount.

Since the pressure control device 630 may perform low pressure cutout, the enclosure 632 of the pressure control device 630 may be colored a second particular color. In some implementations, the color is blue signifying low pressure cutout. However, any color (red, blue, black, green, pink, orange, purple, etc.) can be used to denote high pressure cutout.

Figure 7A:
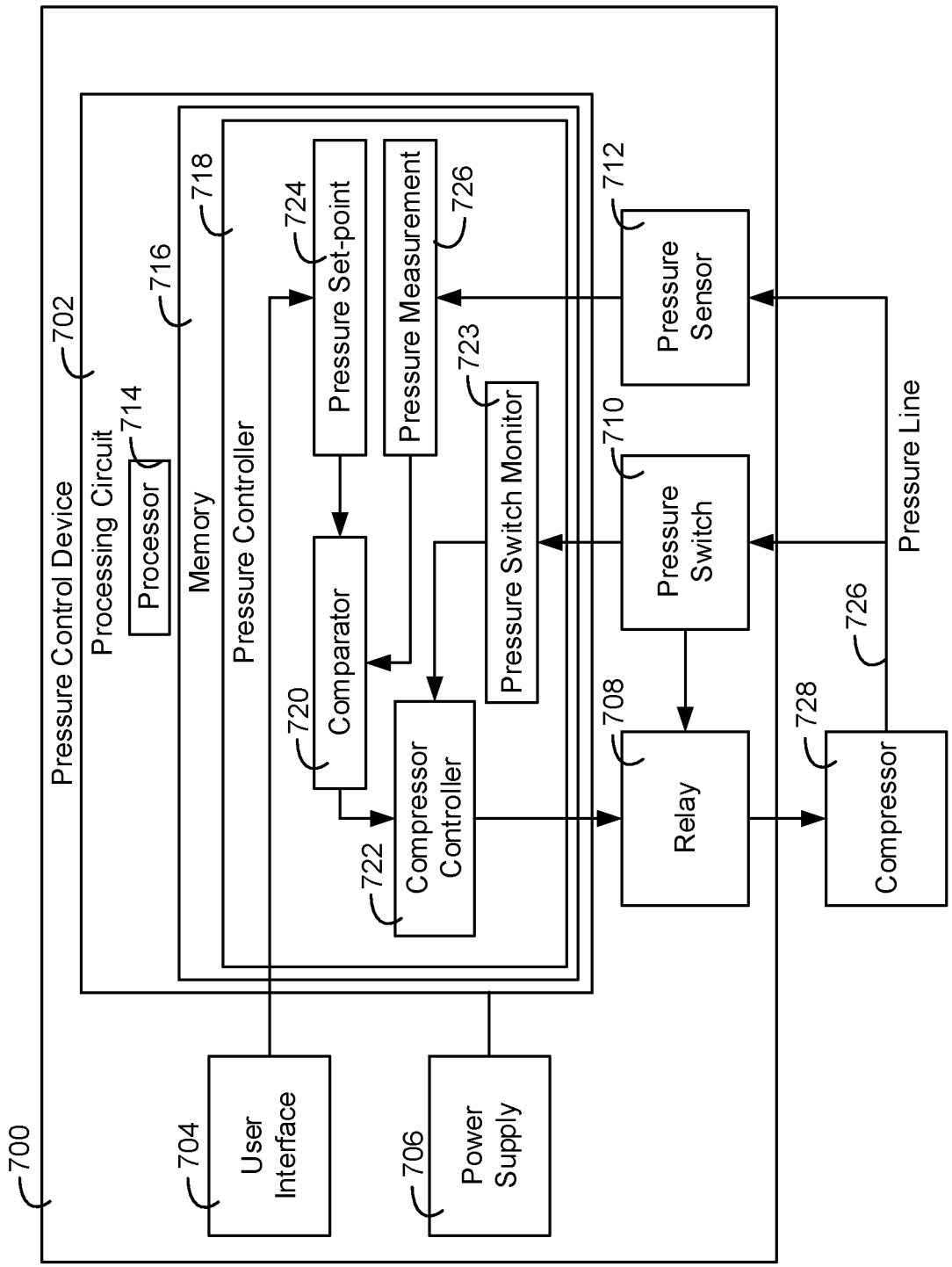
FIG. 7A is a block diagram of one of the pressure control devices of FIGS. 4-6B shown in greater detail, according to an exemplary embodiment.

Referring now to FIG. 7A, a block diagram of a pressure control device 700 is shown, according to an exemplary embodiment. The pressure control device 700 may be the same as or similar to the pressure control device 400 as described with reference to FIG. 4, the pressure control devices 500, 510, 520, and 530 as described with reference to FIGS. 5A-5B, and/or the pressure control devices 600, 610, 620, and/or 630 as described with reference to FIGS. 6A-6B. The pressure control device 700 is shown to include a processing circuit 702, a user interface 704, a power supply 706, a relay 708, a pressure switch 710, and a pressure sensor 712.

The processing circuit 702 is shown to include a processor 714 and a memory 716. The processor 714 can be a general purpose or specific purpose processor, an application specific integrated circuit (ASIC), one or more field programmable gate arrays (FPGAs), a group of processing components, or other suitable processing components. The processor 714 can be configured to execute computer code and/or instructions stored in the memory 716 or received from other computer readable media (e.g., CDROM, network storage, a remote server, etc.).

The memory 716 can include one or more devices (e.g., memory units, memory devices, storage devices, etc.) for storing data and/or computer code for completing and/or facilitating the various processes described in the present disclosure. The memory 716 can include random access memory (RAM), read-only memory (ROM), hard drive storage, temporary storage, non-volatile memory, flash memory, optical memory, or any other suitable memory for storing software objects and/or computer instructions. The memory 716 can include database components, object code components, script components, or any other type of information structure for supporting the various activities described in the present disclosure. The memory 716 can be communicably connected to the processor 714 via the processing circuit 702 and can include computer code for executing (e.g., by the processor 714) one or more processes described herein.

In some embodiments, the processing circuit 702 is a microcontroller (e.g., an eight bit microprocessor, a sixteen bit microprocessor, a thirty two bit processor, and/or a sixty four bit processor). The microcontroller may include or communicate with transitory and/or non-transitory memory. For example, the microcontroller may include electrically erasable programmable read-only memory (EEPROM), FLASH memory, a hard drive, random access memory (RAM) (e.g., DDR2, DDR3, etc.), read only memory (ROM), a data cache, and/or any other circuit or storage element necessary for performing the operations described with reference to the pressure control device 700.

The user interface 704 can be any type of interface allowing a user to view output of the pressure control device 700 and provide input to the pressure control device 700. The user interface 704 may be the same or similar to the interfaces of the pressure control devices shown in FIG. 4, FIGS. 5A-5B, and FIGS. 6A-6B. The user interface 704 can be configured to allow a user to provide information to the processing circuit 702 e.g., input a set-point, clear an error, select an operating mode, etc. The user interface 704 can provide output to the user, e.g., a current pressure measurement, an error message, a menu, etc. The processing circuit 702 can be configured to provide an alarm via the user interface 704 (e.g., display a fault condition, sound a noise, blink an LED), display an alarm message on a display, etc.

The user interface 704 can be an n-digit display (e.g., 4-digit display) with status LEDS and/or can include input devices (e.g., encoders, buttons, etc.). The n-digit display and status LEDs may be components of the display 410 that might light up in response to a particular event or to display a particular letter or number. The n-digit display may include four digits and decimal points for display text (e.g., faults, menus, etc.) and/or values (e.g., pressure value, set-point, trip values, etc.). The processing circuit 702 can control the n-digit display to display a set-point to a user, allow a user to select a set-point, display a sensed refrigerant pressure, display faults, etc.

The status LEDs may be particular labeled LEDS (for example a single LED behind a transparent section of an enclosure forming the word "FAULT") illuminated to convey information to a user. For example, if the pressure is sensed to be high by the pressure control device 700, the pressure control device 700 may cause a "High Pressure" LED to light up. Likewise, if the pressure control device 700 senses low pressure of a refrigerant conduit, a "Low Pressure" LED may light up. Furthermore, the status LEDs may display the units being displayed on the user interface 704 (e.g., PSI, BAR, etc.). In some embodiments, the status LEDs include a warning light such as a fault indicator (e.g., the fault indicators 504, 514, 604, and 614 as described with reference to FIGS. 5A, 5B, 6A, and 6B.

The user interface 704 may include an input device, e.g., a potentiometer, an encoder (e.g., the encoders 506, 516, 526, and 536 as described with reference to FIGS. 5A and 5B), and/or input buttons (e.g., the input buttons 606, 616, 626, and 636 as described with reference to FIGS. 6A-6B). Via the input buttons, a user can input menu navigation, provide set-point input, clear faults, etc. The processing circuit 702 can cause information to be displayed on the user interface 704 based on the input received the input device.

The power supply 706 can be configured to receive power from an external source and power the pressure control device 700. The power supply 706 may receive any alternating current (AC) and/or direct current (DC) power input. In some embodiments, power input is a power input between 24-240 VAC. The power supply 706 can be any power circuit that takes a power input and generates a power source for the pressure control device 700. The power supply 706 can include one or more filtering capacitors, filter circuits, power regulators, rectifiers, etc. In some embodiments, the power supply 706 can convert AC power into DC power.

The relay 708 can be an electromechanical switch configured to control a compressor (e.g., a compressor 728). The relay 708 can be configured to turn the compressor 728 on or off (e.g., enable or disable the compressor allowing the compressor to turn itself on or off). The relay 708 can be controlled by the processing circuit 702. The relay may be an interface by which the pressure control device 700 controls a motor or other electrical devices of the compressor 728. In some embodiments, the relay allows for the compressor 728 to be controlled by the pressure control device 700 without directly sourcing power from the power supply 706.

The compressor 728 can be any compressor device operated by a AC motor, a variable speed drive (VSD), etc. The compressor 728 can be configured to compress refrigerant inside a conduit, e.g., the pressure line 726. In some embodiments, the compressor 728 can be a residential compressor and the pressure line 726 can be the refrigerant conduits of a residential HVAC system. An example of a residential compressor and refrigerant conduit is shown in U.S. patent application Ser. No. 15/417,185 filed Jan. 26, 2017, the entirety of which is incorporated by reference herein. Furthermore, the compressor 728 may be an industrial compressor for an industrial HVAC device. For example, an industrial HVAC device may be a chiller, e.g., the chiller 102 as described with further reference to FIGS. 1-2.

The pressure switch 710 can be a switch which can control the operation of the compressor 728. Specifically, the pressure switch 710 can be a mechanical pressure switch that causes the relay 708 to turn the compressor 728 on or off. For example, the pressure switch 710 can be a mechanically actuated pressure switch that actuates based on the pressure of the contents of the pressure line 726. For example, if the pressure rises above, or falls below, a mechanically defined limit (a pressure threshold), the pressure switch 710 can cause the relay 708 to actuate causing the compressor 728 to be turned on or off (enabled or disabled). The pressure switch 710 may be a redundant control to the compressor 728, i.e., the processing circuit 702 can be also be the first controller of the compressor 728 while the pressure switch 710 is a second redundant controller of the compressor 728. In case the processing circuit 702 fails, since the pressure switch 710 is mechanical, the pressure switch 710 provides backup control of the compressor 728.

The pressure sensor 712 can be a sensor that senses the pressure of the refrigerant of the pressure line 726. The pressure sensor 712 can be a pressure transducer or any electromechanical device that can be configured to measure the pressure of the pressure line 726 and communicate the measured pressure to the processing circuit 702. In some embodiments, the pressure sensor 712 includes one or more mechanical devices, e.g., transducers that can measure the pressure of the pressure line 726. The pressure sensor 712 may provide an analog or digital signal to the processing circuit 702 that the processing circuit 702 can be configured to decode and store.

The memory 716 is shown to include a pressure controller 718. The pressure controller 718 can be configured to receive inputs from the pressure switch 710 and the pressure sensor 712 and control the compressor 728 based on one or both of the inputs of the pressure switch 710 and the pressure sensor 712.

The pressure controller 718 is shown to store a pressure set-point 724 and a pressure measurement 727. The pressure set-point 724 may be a value received from the user interface 704. This value may be the desired pressure for the pressure line 726 that a user has input via the user interface 704. The pressure measurement 727 may be a value received from the pressure sensor 712. The pressure controller 718 may include one or more analog to digital converters (ADCs) that can convert analog signals received from the pressure sensors 712 into the pressure measurement 727. The pressure controller 718 can periodically update the pressure measurement 727 by measuring an analog value output by the pressure sensor 712 at a predefined period. In some embodiments, the pressure set-point 724 is a pressure value that the pressure controller 718 controls the pressure of the pressure line 726 to. In some embodiments, the pressure set-point is a high threshold or a low threshold. The compressor controller 722 can control the compressor 728 (disable or enable) in response to the pressure exceeding the high pressure threshold or being less than the low pressure threshold.

The pressure controller 718 is shown to include a comparator 720. The comparator 720 can compare the pressure set-point 724 with the pressure measurement 727. Based on the comparison of the pressure set-point 724 and the pressure measurement 727, the comparator 720 can notify the compressor controller 722 whether or not the compressor 728 should be turned on or turned off. The comparator 720 can be configured to implement dead-band control and/or hysteresis.

The pressure switch monitor 723 can be configured to monitor the current status of the pressure switch 710. The pressure switch monitor 723 can determine whether the pressure switch 710 has triggered i.e., whether the pressure line 726 has reached a pressure above or below a predefined amount. The compressor controller 722 can receive the status of the pressure switch from the pressure switch monitor 723 and operate the compressor based on the status.

The compressor controller 722 can be configured to control the compressor 728. The compressor controller 722 can be configured to control the compressor 728 via the relay 708. The compressor controller 722 can be configured to turn the compressor 728 on or off based on the comparison of the pressure set-point 724 and the pressure measurement 727 by the comparator 720 and based on the status of the pressure switch 710 monitored by the pressure switch monitor 723. The compressor controller 722 may treat the status of the pressure switch 710 as an override to the comparison. For example, if the pressure switch 710 has triggered, the compressor controller 722 can turn the compressor 728 off regardless of the comparison between the pressure set-point 724 and the pressure measurement 727. If the pressure switch 710 has not triggered, the compressor controller 722 can operate the compressor 728 based on the comparison of the pressure set-point 724 and the pressure measurement 727 to control the pressure line 726 pressure to the pressure set-point 724.

Figure 7B:
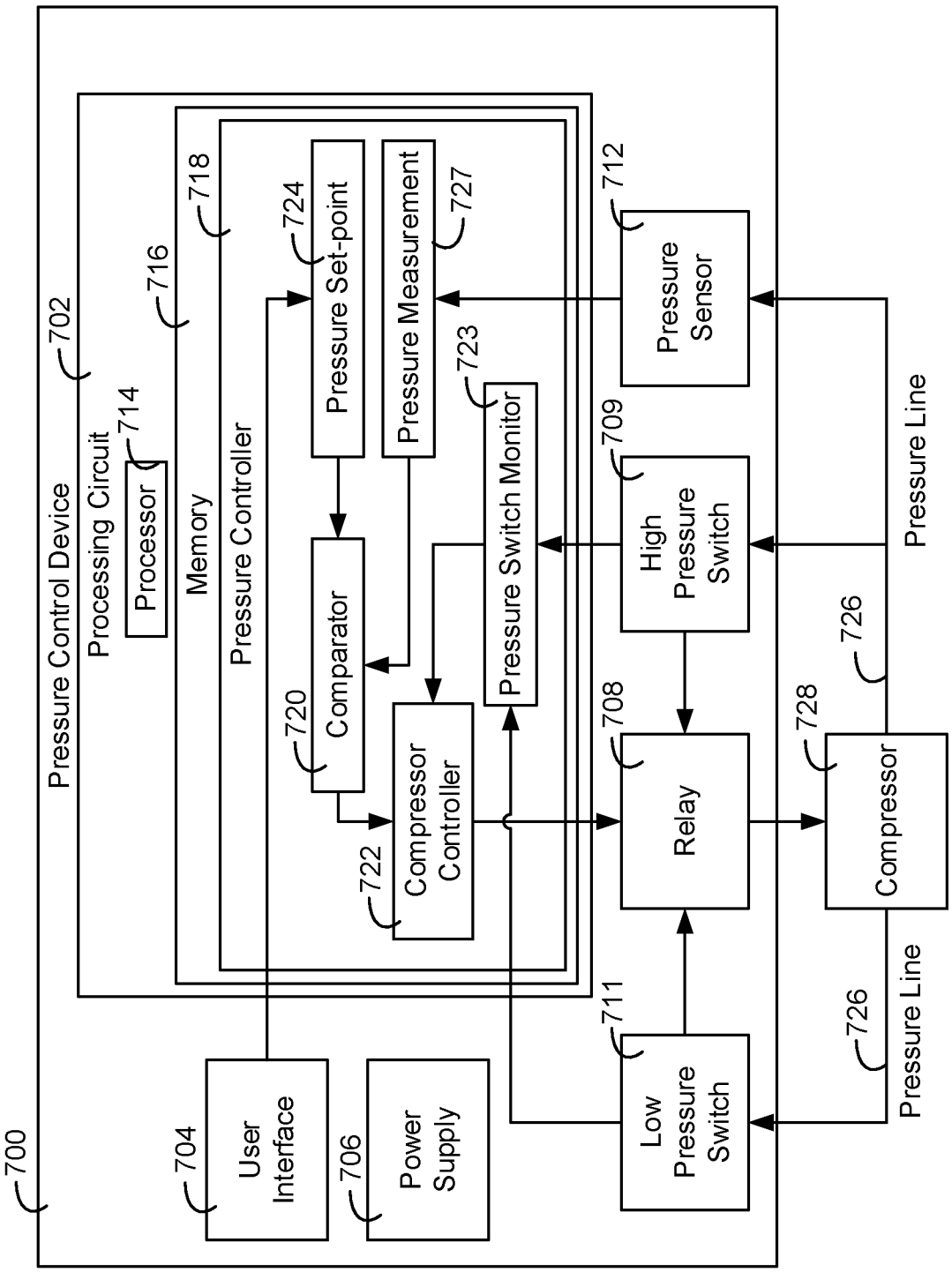
FIG. 7B is a block diagram of the pressure control device of FIG. 7A shown to include both a high pressure switch and a low pressure switch, according to an exemplary embodiment.

Referring now to FIG. 7B, the pressure control device 700 is shown including two pressure switches, according to an exemplary embodiment. The pressure switches of the pressure control device 700 include a low pressure switch 711 and a high pressure switch 709. The low pressure switch 711 and the high pressure switch 709 may be similar or the same as the pressure switch 710. In some embodiments, the low pressure switch 711 and the high pressure switch 709 are combined into a single pressure switch.

The low pressure switch 711 may actuate in response to the pressure of the pressure line 726 falling below a predefined amount. The low pressure switch can turn on and/or off the compressor 728 via the relay 708 in response to the pressure of the pressure line 726 falling below the predefined amount. Similarly, the high pressure switch 709 can be configured to actuate in response to the pressure of the pressure line 726 rising above a predefined amount. The high pressure switch 709 can be configured to turn off the compressor in response to the pressure of the pressure line 726 rising above the predefined amount.

The pressure switch monitor 723 can monitor the status of both the low pressure switch 711 and the high pressure switch 709. The pressure switch monitor 723 can communicate the status of the low pressure switch 711 and the high pressure switch 709 to the compressor controller 722. Based on the status of the two switches, the compressor controller 722 can be configured to turn the compressor on or off. If the high pressure switch 709 of the pressure switches have triggered, the compressor controller 722 can be configured turn the compressor off. Similarly, if the low pressure switch 711 has triggered, the compressor controller 722 can be configured turn the compressor on and/or off. Turning the compressor 728 on or off in response to the status of the high pressure switch 709 and/or the low pressure switch 711 may be an override. For example, the compressor controller 722 may only control the compressor 728 based on the comparison of the pressure set-point 724 and the pressure measurement 727 in response to determining that neither of the high pressure switch 709 and the low pressure switch 711 have triggered.

Figure 7C:
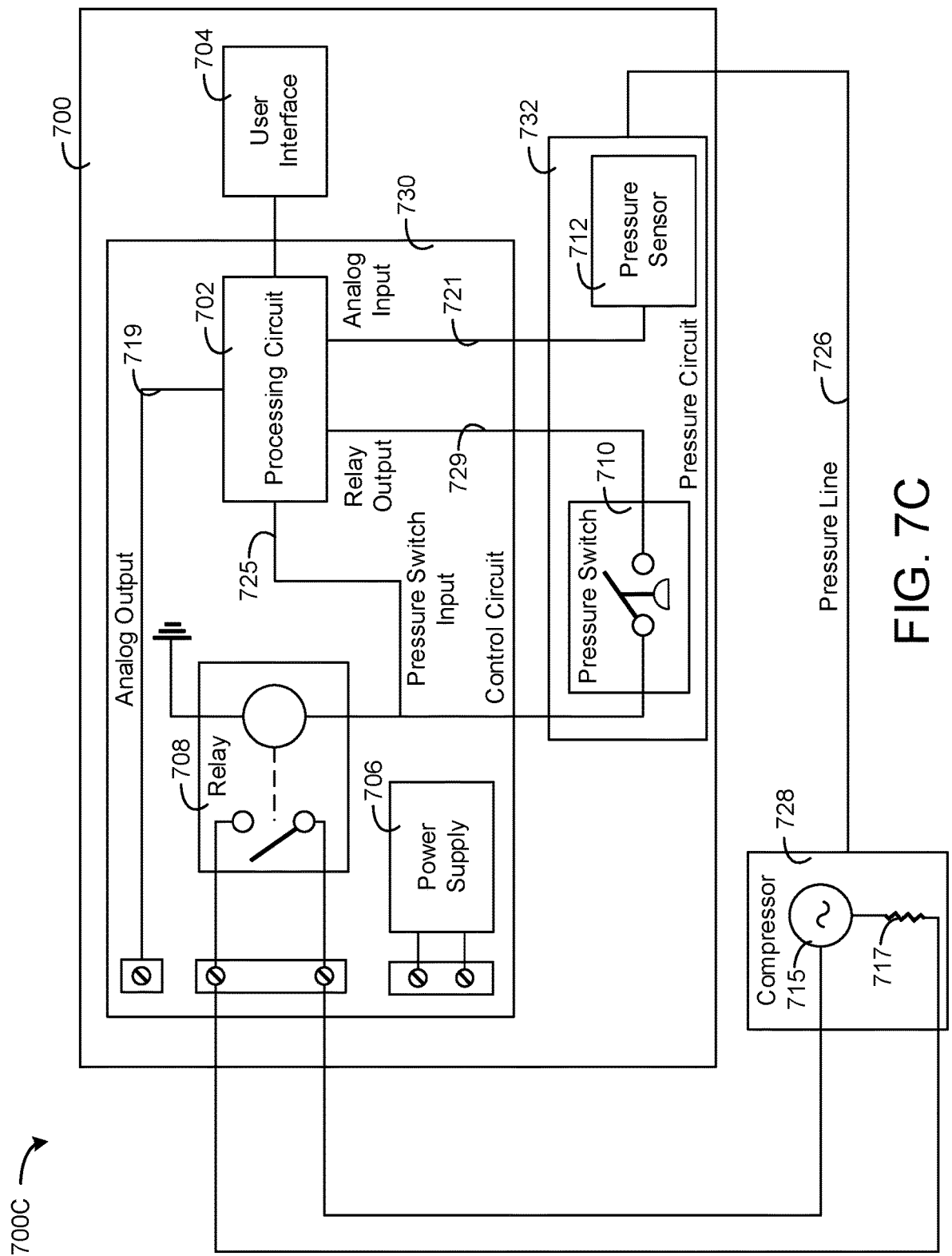
FIG. 7C is a circuit schematic of the pressure control device of FIG. 7A where a relay that is configured to control a compressor is directly grounded, according to an exemplary embodiment.

Referring now to FIG. 7C, a circuit schematic 700C of the pressure control device 700 as described with reference to FIG. 7A is shown, according to an exemplary embodiment. The components of the pressure control device 700 as described with reference to FIGS. 7A and 7B and are shown and described in greater detail in FIG. 7C. The pressure control device 700 is shown to include a control circuit 730 for controlling the compressor 728 and a pressure circuit 732 for sensing the pressure of the pressure line 726. The lines of FIG. 7C that connect the various components together may be printed circuit board (PCB) traces, wires, and/or any other electrical conductor. These may connect the various electrical terminals of the components of FIG. 7C. However, the pressure line 726 may be a conduit for pressurized refrigerant.

The control circuit 730 and the pressure circuit 732 may be individual PCBs within the pressure control device 700. In some embodiments, the control circuit 730 and the pressure circuit 732 may be particular groups of components on a single PCB. The control circuit 730 is shown to include the processing circuit 702, the power supply 706, and the relay 708. The processing circuit 702 is shown to be electrically coupled to the pressure sensor 712 via an analog input 721. One or more pins or inputs of the processing circuit 702 may connect to the analog input 721 to read an analog signal created by the pressure sensor 712. The processing circuit 702 can convert the analog reading of the analog input 721 into a digital value (e.g., the pressure measurement 727).

The processing circuit 702 is shown to be coupled to the pressure switch 710 via a relay output 729 and the pressure switch input 725. The relay output 729 of the processing circuit 702 may connect to one side of the pressure switch 710 while the pressure switch input 725 may connect to the other side of the pressure switch 710. Furthermore, the pressure switch input 725 may be connected to one side of the relay 708. The other side of the relay 708 may be grounded.

If the processing circuit 702 determines that it should turn the compressor 728 on (e.g., enable the compressor), the processing circuit 702 may cause the relay output 729 to be a high voltage (e.g., 3.3 volts DC, 5 volts DC, etc.). The pressure switch 710 may be a normally closed switch, i.e., the relay will be closed unless the pressure of the pressure line 726 has risen above a predefined amount. The pressure switch input 725 of the processing circuit 702 may be a high impedance input to the processing circuit 702, therefore, current may flow from the relay output 729, through the closed pressure switch 710, through the relay 708 to ground. The current may flow through an inductor of the relay 708, causing a magnetic field to be created within the relay 708. The magnetic field may open or close the switch of the relay 708 causing the compressor 728 to be turned on or off.

In FIG. 7C, the compressor 728 is modeled as a voltage source 715 and a load 717. The voltage source 715 may be a DC voltage source or an AC voltage source. The load 717 may be the resistance, capacitance, or inductance of the motor of the compressor 728. In some embodiments, the load is a circuit configured to turn the compressor 728 on or off. When the relay 708 is closed as operated by either the processing circuit 702, the compressor 728 may turn on or may otherwise be enabled to turn itself on as it determines is necessary.

The pressure circuit 732 is shown to include the pressure switch 710 and the pressure sensor 712. The pressure sensor 712 can measure the pressure of the pressure line 726 and communicate the measured pressure to the processing circuit 702 via the analog input 721. The pressure switch 710 can be configured to cause the compressor 728 to be turned off. Since the pressure switch 710 may be a normally closed switch, i.e., the switch only opens when the pressure of the pressure line 726 rises above or falls below a predefined amount, the pressure switch 710 can control whether the processing circuit 702 is able to control the compressor 728 and can provide an automatic shut off (or disablement) of the compressor 728 whether or not the processing circuit 702 and/or the pressure sensor 712 are functioning and regardless of the control decisions made by the processing circuit 702.

If the pressure switch 710 opens, no current may flow through the relay 708 (one side of the relay 708 is high impedance while the other side of the relay 708 is ground). Since, no current is flowing through the relay 708, the inductor of the relay may not create a magnetic field and the switch of the relay 708 may open. With the switch open, the compressor 728 may turn off. Therefore, whenever the pressure switch 710 triggers, the compressor 728 may turn off.

The processing circuit 702 is shown to generate an analog output 719. The analog output 719 may be an output with a voltage range from 0-10 volts and a current range of 4-20 mA. The analog output 719 may control a valve, a fan, and/or be used for controlling one or more components of a refrigeration system or the compressor 728. In some embodiments, analog output 719 can cause a refrigeration system and/or a refrigeration system component to turn off and/or turn on. For example, the analog output 719 can be used to control a compressor, a valve, an actuator, or any other component capable of affecting a pressure in the refrigeration system.

In some embodiments, the analog output 719 is a communication interface and/or is an analog voltage proportional to the pressure measured by the pressure sensor 712. In this regard, another device or controller can interface with the pressure control device 700 via the analog output 719 to determine what the pressure of the pressure line 726 is. In some embodiments, the analog voltage can be used to notify a controller of a fault, alarm or error.

Figure 7D:
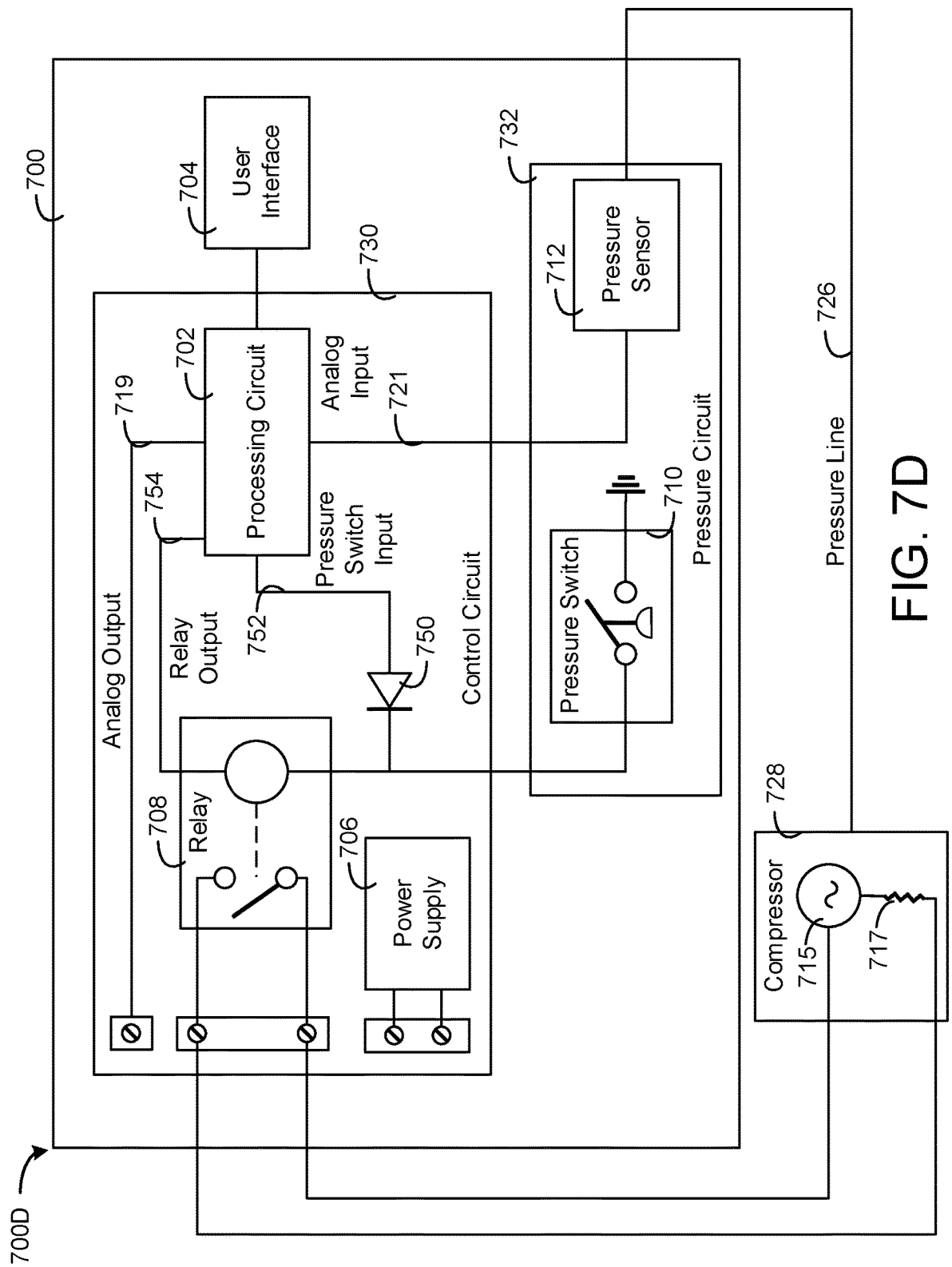
FIG. 7D is a circuit schematic of the pressure control device of FIG. 7A where the relay for controlling the compressor is grounded through a mechanically actuated pressure switch, according to an exemplary embodiment.

Referring now to FIG. 7D, a circuit schematic 700D of the pressure control device of FIG. 7A is shown where the relay 708 is grounded through the pressure switch 710, according to an exemplary embodiment. In FIG. 7D, one side of the pressure switch 710 is grounded while the other side of the pressure switch 710 may be connected to the relay 708 and to a diode 750. Relay output 754 of the processing circuit 702 may be used to turn the compressor 728 on or off.

Specifically, if the relay output 754 is caused to be a high voltage by the processing circuit 702 and the pressure switch 710 is a normally closed pressure switch and the pressure switch 710 has not triggered, current will flow from the relay output 754, through the relay 708, and through the pressure switch 710 to ground. Current may not flow to the processing circuit 702 via the pressure switch input 752 due to the diode 750. The diode 750 may protect the pressure switch input 752 of the processing circuit 702 from being damaged and may ensure that the relay 708 is turned on when the relay output 754 is set to a high voltage. The processing circuit 702 can be configured to sense, via the pressure switch input 752, whether the pressure switch 710 has triggered.

If the pressure switch 710 triggers, i.e., the pressure switch opens, the compressor 728 will be disabled. Even if the processing circuit 702 raises the relay output 754 to a high voltage, no current will flow through the relay 708 and therefore the relay will be open. For this reason, turning the compressor off with the pressure switch 710 is independent of the functionality of the processing circuit 702 and/or the pressure sensor 712.

Figure 7E:
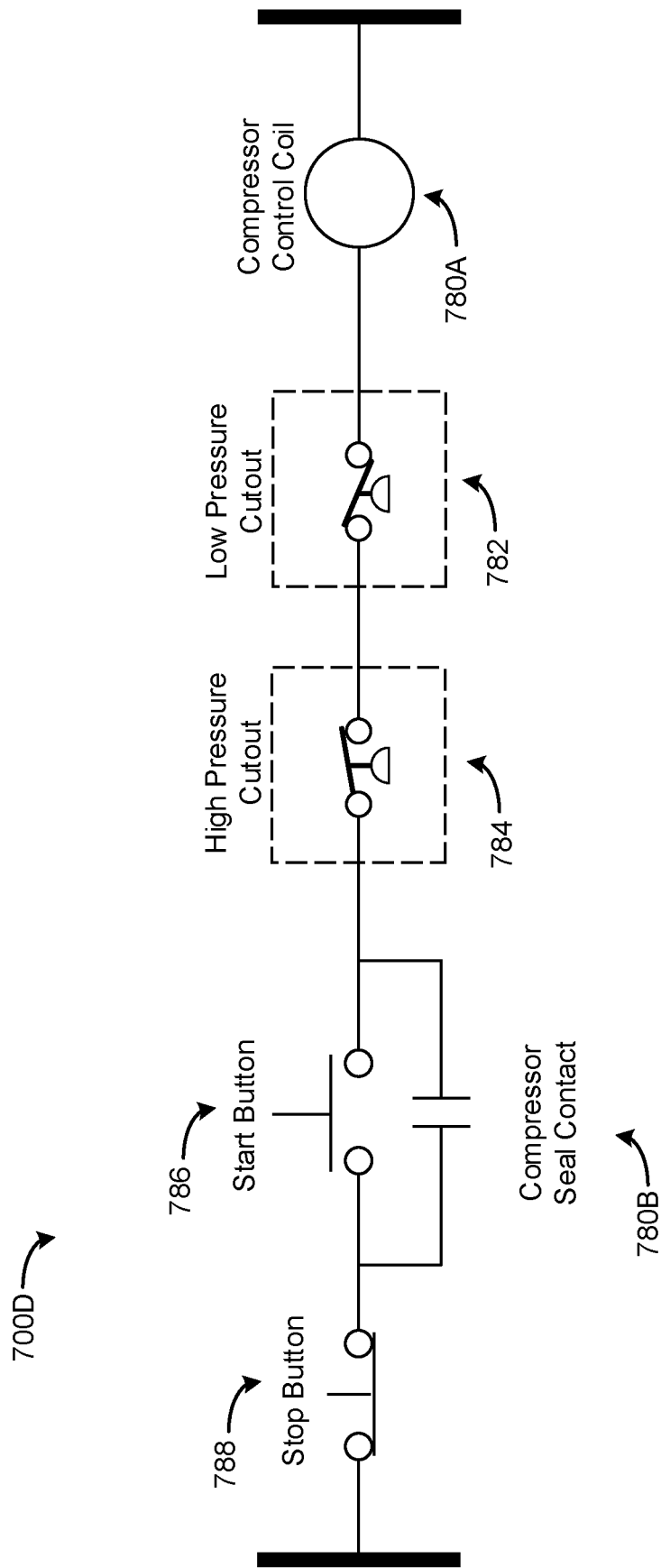
FIG. 7E is a compressor start/stop circuit schematic illustrating a use case of the pressure control device of FIG. 7A, according to an exemplary embodiment.

Referring now to FIG. 7E, a start/stop circuit 700D illustrating a use case of the pressure control device 700, according to an exemplary embodiment. The start/stop circuit 700D illustrates a circuit that can be used to start the compressor 728 and stop the compressor 728. The start/stop circuit 700D is shown to include a stop button 788 and a start button 786. The stop button 788 is shown as a normally closed button. Actuating the stop button 788 causes the compressor 728 to be turned off. The start button 786 is shown as a normally open button. Actuating the start button 786 can cause the compressor 728 to be turned on.

The compressor control coil 780A and the compressor seal contact 780B can be configured to cause the compressor 728 to be turned on and stay operational in response to the start button 786 being actuated. The compressor control coil 780A and the compressor seal contact 780B may be components of a relay. More specifically, the compressor control coil 780A may be a relay coil while the compressor seal contact 780B, illustrated as a normally open contact, may be the contact for the relay.

In response to actuating the start button 786, the compressor control coil 780A may energize and cause the compressor seal contact 780B to close. If the start button 786 is released, since the compressor seal contact 780B is closed, the compressor 728 may continue to operate. However, the high pressure cutout 784 and the low pressure cutout 782 can be configured to cause the compressor 728 to be turned off. The high pressure cutout 784 may be the pressure control device 700 configured to perform high pressure cutout. In response to the high pressure cutout 784 identifying that a pressure has risen above a predefined amount, either a digital system (e.g., the pressure sensor 712 and the processing circuit 702) or a mechanical system (e.g., the pressure switch 710) can be configured to turn off the compressor 728. In a similar manner, the low pressure cutout 782 can be configured to turn off the compressor 728 in response to the pressure falling below a predefined amount with either a digital system or a mechanical system.

Figure 8A:
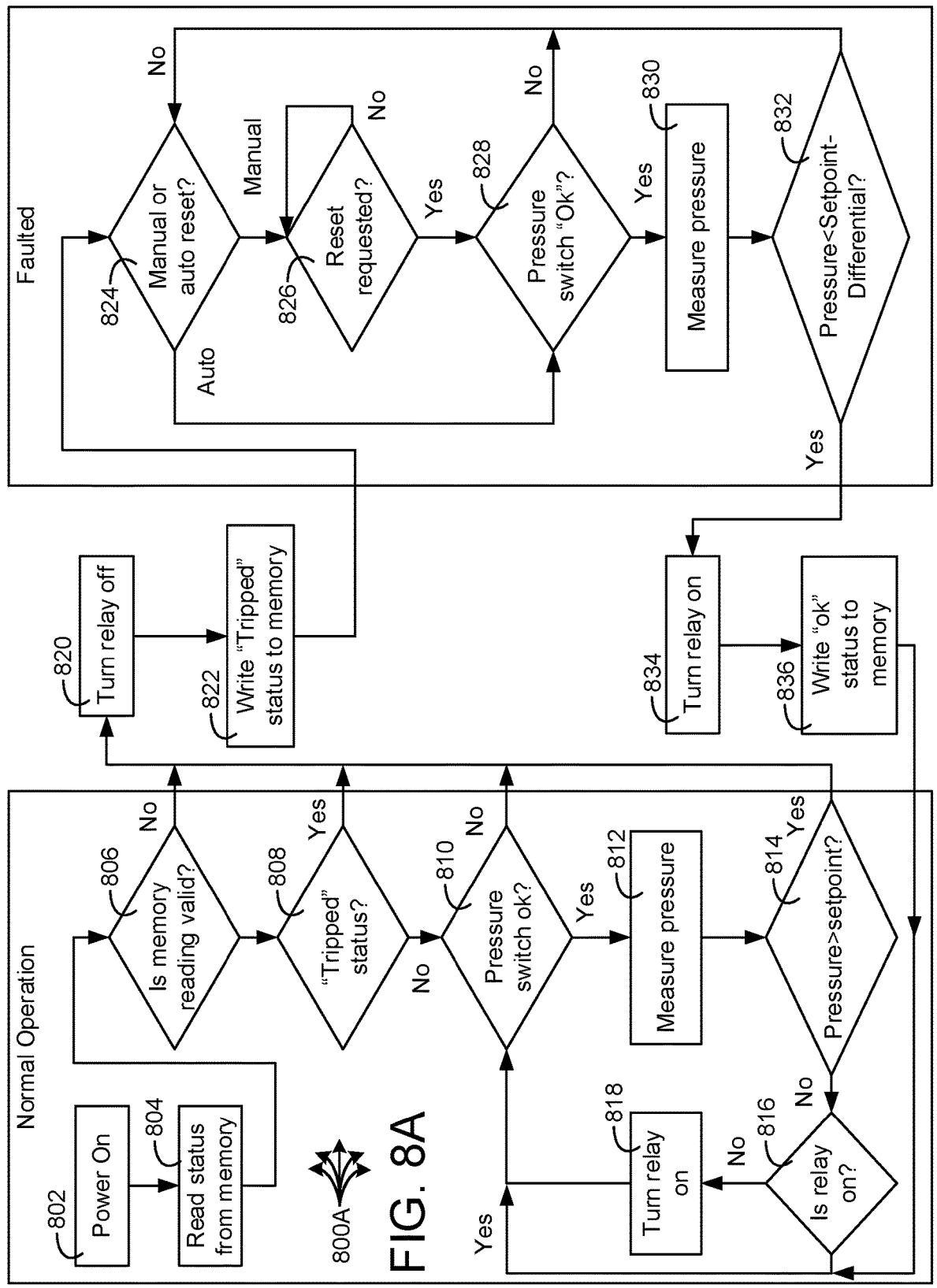
FIG. 8A is a flow diagram of a process for operating the pressure control device of FIG. 7A to turn the compressor on and off, according to an exemplary embodiment.

Referring now to FIG. 8A is a flow diagram of a process 800A for operating the pressure control device of FIG. 7A to turn the compressor 728 on and off is shown, according to an exemplary embodiment. The pressure control device 700 can be configured to perform process 800A. In some embodiments, the processing circuit 702 of the pressure control device 700 can be configured to perform process 800A. The process 800A is a flowchart of software (e.g., firmware) operations for the processing circuit 702. The pressure controller 718 of the memory 716 can be configured to perform the process 800A. The process 800A makes reference to memory, i.e., the memory 716. In some embodiments, the memory referred to in the process 800A is EEPROM memory.

At step 802, pressure control device 700 is powered on. At step 804, the pressure controller 718 reads the memory 716 and/or any other data stored on data storage devices which pressure control device 400 may include. The status read at step 804 may indicate whether the pressure switch 710 has been tripped or not. Furthermore, in some embodiments, the reading may indicate that there is a fault and/or there was a system error or a pressure error (e.g., pressure limit trip).

At step 806, the pressure controller 718 determines whether the reading of step 804 is valid. This may indicate whether the memory 716 was successfully read (e.g., whether the status is a valid status). If the reading is not valid, pressure controller 718 can perform the step 820. If the reading is valid, the pressure controller 718 can perform step 808.

At the step 808, based on the reading of the step 804, the pressure controller 718 determines whether the reading indicates any tripped statuses (e.g., measured pressure above a predefined amount or the pressure switch 710 tripping). If there is a tripped status, the pressure controller 718 performs the step 820. If there is no trip status, the pressure controller 718 performs 810.

At step 810, pressure controller 718 determines whether the pressure switch 710 is ok (e.g., has been tripped by a high or low pressure). The pressure controller 718 may receive the status of the pressure switch 710 via the pressure switch input 725 or the pressure switch 710 as described with further reference to FIGS. 7C-7D. The pressure switch monitor 723 can monitor the status of the pressure switch 710. In this regard, the pressure controller 718 can determine if the pressure switch 710 is on or off, has detected a pressure above a predefined amount or has detected a pressure below a predefined amount. If the pressure switch is not ok, the pressure controller 718 performs the step 820. If the pressure switch is ok, the pressure controller 718 performs step 812.

At the step 812, the pressure controller 718 can read a pressure value of a refrigeration system. More specifically, the pressure controller 718 can read a pressure measurement from the pressure sensor 712 for the pressure line 726 and store the value as the pressure measurement 727.

At step 814, the pressure controller 718 determines whether the pressure measured at step 812, the pressure measurement 727, is above the pressure set-point 724. The pressure controller 718 can perform this determination via the comparator 720. In some embodiments, the set-point is set via the user interface 704. If the pressure reading of step 812 is above the pressure set-point 724, the pressure controller 718 performs the step 820. If the pressure measured at the step 812 is not above the pressure set-point 724, the pressure controller 718 performs the step 816.

At the step 816, the pressure controller 718 determines if the relay 708 is on or off. Specifically, the pressure controller 718 can determine whether it is currently controlling the relay 708 to be on or off. If the relay 708 is not on, the pressure controller 718 performs step 818.

At the step 818, the pressure controller 718 turns on the relay 708. This may turn on or enable the compressor 728. The processing circuit 702 can be configured to turn on or enable the compressor 728 via the relay 708. The process 800A then continues to step 810. If at the step 816, pressure controller 718 determines that relay 708 is currently on, pressure controller 718 performs the step 810.

At step 820, the pressure controller 718 turns the relay 708 off and then proceeds to step 822. Turning the relay 708 off may turn off or disable the compressor 728. At step 822, the pressure controller 718 writes a "tripped" indicator to the memory 716. This may indicate that the pressure measured at step 812, the pressure measurement 727, is higher than a predefined amount. This may also indicate that pressure switch 710 and/or the pressure sensor 712 has indicated that there is a pressure fault (e.g., the step 810).

The tripped indicator may also indicate that the memory 716 failed to read at the step 808 (e.g., the step 806). In some embodiments, the pressure controller 718 updates a fault log indicating that there was a fault and/or that pressure controller 718 has recovered from the fault. The fault may indicate whether the fault was detected at the steps 806, 808, or 810.

At the step 824, the pressure controller 718 may determine if the pressure controller 718 is operating in a manual reset or an automatic reset mode. A manual reset may be an external reset while an automatic reset may be an internal reset. The mode may be indicated by a user via the user interface 704. The pressure controller 718 may store the operating mode. If the pressure controller 718 is operating in automatic mode, the process 800A may continue to step 828. If pressure control device 400 is operating in manual mode, process 8 may continue to step 826.

At step 826, the pressure controller 718 waits until a reset has been requested from a user via the user interface 704. In some embodiments, the pressure controller 718 receives the reset command from an encoder and/or any other user input (e.g., a button). If the reset has been requested, the pressure controller 718 continues to step 828. At the step 828, the pressure controller 718 determines if the pressure switch 710 is "ok." The pressure switch 710 being "ok" may mean that the pressure switch 710 does not indicate that the refrigerant pressure of the pressure line 726 is above and/or below a predefined amount. The pressure controller 718 may determine that the pressure switch is "ok" via the pressure switch input 725 and/or the pressure switch input 752 as described with further reference to FIGS. 7C and 7D. If the pressure switch 710 is "ok," the pressure controller 718 continues to step 830.

At the step 830, the pressure controller 718 measures the refrigerant pressure via the pressure sensor 712. The value measured by the pressure sensor 712 may be the pressure measurement 727. At the step 832, the pressure controller 718 determines if the pressure measured at the step 830 (e.g., the pressure measurement 727) is less than a set-point value (e.g., the pressure set-point 724) minus a differential value. The differential value may be a predefined amount. This may indicate that the pressure measured at the step 830 is not only less than the set-point, but also a predefined amount less than the set-point.

At step 834, the pressure controller 718 may turn the relay 708 on. This may enable (e.g., turn on) the compressor 728 connected to pressure control device 400. At step 836, pressure control device 400 can write an "ok" status to the memory 716. In some embodiments, the "ok" status overwrites the "tripped" status written to the memory 716 in the step 822. In some embodiments, the pressure controller 718 updates a fault log indicating that there was a fault and/or that the pressure controller 718 has recovered from the fault.

Referring now to FIG. 8B of a flowchart of a process 800B for controlling the pressure control device 700 and verifying that the memory 716 is operating correctly, according to an exemplary embodiment. The process 800B may be similar to the process 800A, therefore, many of the steps of the process 800B are the same as the steps of the process 800A. The pressure control device 700 and/or any other computing device described herein can be configured to perform the process 800B. The "memory" device referenced in the process 800B may be the memory 716 and in some embodiments is EEPROM.

In step 850, the pressure controller 718 can be configured to write a "tripped" status to the memory 716. The pressure controller 718 may write the "tripped" status to the memory 716 multiple times (e.g., three times). The pressure controller 718 may write the "tripped" status to the memory 716 in response to determining that a reading from the memory 716 is not valid (step 806), in response to determining that the "tripped" status is already written to the memory 716 (step 808), and/or in response to determining that the pressure switch 710 has been triggered (step 810).

In step 852, the pressure controller 718 can be configured to turn off the relay 708 and then proceed to the step 854. In step 854, the pressure controller 718 can read the memory 716 to verify that the "tripped" status has been written to the memory 716, thus verifying proper operation of the memory 716. In some embodiments, the step 854 may be the same or similar to the steps 804 and the step 806. If the memory reading is valid, the process 800B can continue to step 856. If the reading is not valid, the process 800B can continue to the step 850. The pressure controller 718 may record the number of times that the memory 716 is not valid, i.e., how many times the pressure controller 718 has performed the steps 850 and 852 in a row. If the memory reading has not been valid for a predefined number of times (e.g., three times), the process 800B can proceed to the step 866.

In step 866, the pressure controller 718 may turn of the relay 708. In some embodiments, the step 866 may be the same as or similar to the step 852. The process 800B may then proceed to the step 868. The process 800B can proceed to step 868 where the pressure controller 718 may cause the user interface 704 to display a fault alert, e.g., "memory error."

In step 856, if the memory reading of the step 854 is valid, the pressure controller 718 can disable set-point adjustment. Disabling set-point adjustment may prevent a user from entering a new pressure set-point 724 via the user interface 704. The process 800B may then proceed with steps 824-832 with set-point adjustment disabled.

After performing the step 832, the process may proceed to step 858. In step 858, the pressure controller 718 can write an "ok" status to the memory 716 multiple times. In some embodiments, the pressure controller 718 writes the "ok" status to memory three times. The process may proceed to the step 860. In the step 860, the pressure controller 718 can turn the relay 708. The step 860 may be the same as and/or similar to the step 818.

In step 862, the pressure controller 718 can verify that the memory 716 is operating correctly. The pressure controller 718 may read the memory 716 to verify that the "ok" status was written. The step 862 may be the same as or similar to the step 818. If the memory 716 is not operating correctly, the pressure controller 718 can return to the step 858. If the memory 716 is operating correctly, the pressure controller 718 can perform the step 864. If the memory 716 is not operating correctly after attempting to verify operation of the memory 716 a predefined number of times (e.g., three), i.e., performing the steps 858 and 860 the predefined amount of time without the memory 716 operating correctly, the process 800B can proceed to the step 866. In the step 864, the, the pressure controller 718 can re-enable set-point adjustment that was disabled in the step 856. The process 800B can then proceed to the step 804.

Referring again to FIGS. 7A and 8A, two main sub-systems of pressure control device 700 are illustrated. The first system is the processing circuit 702 and the pressure sensor 712. This may be referred to as the digital system. The digital system uses measured pressure values from the pressure sensor 712 to control the compressor 728. The method by which the digital system operates is shown in the process 800A.

In the process 800A, the processing circuit 702 uses measurements of the pressure sensor 712 to determine whether to enable or disable the compressor 728. Specifically, if a pressure measured by the pressure sensor 712 is greater than a set-point (e.g., step 814) (e.g., a set-point adjustable via encoder 404 and/or a button), the processing circuit 702 can control the relay 708 causing the compressor 728 to be turned off (disabled) (step 820). This may digitally ensure that the pressure does not exceed a stored set-point, and if the measure pressure does exceed the stored set-point, the compressor is disabled. This digital system may require both the processing circuit 702 and the pressure sensor 712 to be properly functioning but may operate regardless of the pressure switch 710 operating properly, i.e., the digital system can still disable the compressor 728 if the pressure switch 710 has failed to disable the compressor 728. Furthermore, if the pressure sensor 712 stops properly measuring pressure, the relay 708 ceases to function, or the processing circuit 702 crashes, the pressure switch 710 can still operate to turn off and/or turn on the compressor 728 regardless of the functionality of the pressure sensor 712 and the processing circuit 702.

The second system main sub-system is the mechanical system. The mechanical system may include the pressure switch 710. The pressure switch 710 may be a high pressure switch that is configured to determine if sensed pressure (e.g., pressure that pressure switch 710 senses) of the pressure line 726 is above a predefined amount (e.g., a fixed level). If the sensed pressure is above the predefined amount, the pressure switch 710 can cause the relay 708 to disable the compressor 728. The mechanical system may act as a failsafe to complement the digital system. For example, if the digital system fails for any reason (e.g., the pressure sensor 712 or the processing circuit 702 fail), the mechanical system can still disable the compressor if the pressure reaches a dangerous level.

By having two methods for disabling the compressor, i.e., using the digital system and the mechanical system, various requirements for safety can be met and/or redundancy can be implemented. Specifically, based on at least the mechanical and digital systems, the PED EN 12263 directive may be met.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A pressure control device for controlling a compressor, the pressure control device comprising:
    a pressure sensor configured to measure pressure of a pressure line;
    a processing circuit configured to:
        receive a signal indicative of the pressure of the pressure line measured by the pressure sensor; and
        control the compressor using a set-point and the signal; and
    a mechanical switch sensitive to the pressure of the pressure line and configured to move between an open position and a closed position responsive to the pressure of the pressure line, wherein movement of the mechanical switch into one of the open position or the closed position causes the compressor to turn off and overrides the control of the compressor by the processing circuit;
    wherein the processing circuit is configured to turn off the compressor in response at least in part to determining that the pressure of the pressure line exceeds a pressure threshold when the mechanical switch is not turning off the compressor.

2. The pressure control device of claim 1, wherein the mechanical switch is configured to move into the open position or the closed position in response to the pressure of the pressure line exceeding a pressure threshold, thereby causing the compressor to turn off when the pressure of the pressure line exceeds the pressure threshold.

3. The pressure control device of claim 1, wherein the mechanical switch is configured to move into the open position or the closed position in response to the pressure of the pressure line being below the pressure threshold, thereby causing the compressor to turn on or turn off when the pressure of the pressure line is below the pressure threshold.

4. The pressure control device of claim 1, wherein the processing circuit is configured to:
    determine whether the pressure of the pressure line exceeds the pressure threshold;
    determine whether the mechanical switch has moved into the open position or the closed position; and
    turn off the compressor in response to determining that the pressure of the pressure line exceeds the pressure threshold when the mechanical switch has failed to turn off the compressor.

5. The pressure control device of claim 1, further comprising a pressure connector that connects the mechanical switch and the pressure sensor to the pressure line, wherein the pressure sensor is configured to measure the pressure of the pressure line via the pressure connector.

6. A pressure control device for controlling a compressor, the pressure control device comprising:
    a pressure sensor configured to measure pressure of a pressure line;
    a processing circuit configured to:
        receive a signal indicative of the pressure of the pressure line measured by the pressure sensor; and
        control the compressor using a set-point and the signal;
    a mechanical switch sensitive to the pressure of the pressure line and configured to move between an open position and a closed position responsive to the pressure of the pressure line, wherein movement of the mechanical switch into one of the open position or the closed position causes the compressor to turn off and overrides the control of the compressor by the processing circuit; and
    a user interface configured to display information to a user and receive input from the user, wherein the user interface allows the user to enter a pressure set-point;
    wherein the user interface comprises:
        a display configured to display information to the user, wherein the processing circuit is configured to cause the display to display an indication of the pressure of the pressure line; and
        an encoder positioned on a front surface of the pressure control device, wherein the encoder is configured to receive the pressure set-point from the user.

7. A pressure control device for controlling a compressor, the pressure control device comprising:
    a pressure sensor configured to measure pressure of a pressure line;
    a processing circuit configured to:
        receive a signal indicative of the pressure of the pressure line measured by the pressure sensor; and
        control the compressor using a set-point and the signal;
    a mechanical switch sensitive to the pressure of the pressure line and configured to move between an open position and a closed position responsive to the pressure of the pressure line, wherein movement of the mechanical switch into one of the open position or the closed position causes the compressor to turn off and overrides the control of the compressor by the processing circuit; and
    a user interface configured to display information to a user and receive input from the user, wherein the user interface allows the user to enter a pressure set-point;
    wherein the user interface comprises:
        a display configured to display information to the user, wherein the processing circuit is configured to cause the display to display the measured pressure of the pressure line; and
        a plurality of touch sensitive buttons positioned on a front surface of the pressure control device for receiving the input from the user.

8. The pressure control device of claim 1, wherein the processing circuit is configured to generate an analog voltage based on the pressure, wherein a value of the analog voltage is proportional to the pressure.

9. The pressure control device of claim 1, wherein the processing circuit is configured to:
    determine whether the pressure control device is in a manual or auto reset mode; and
    in response to determining that the pressure control device is in the auto reset mode:
        determine whether the mechanical switch is tripped, wherein the mechanical switch trips in response to the pressure of the pressure line being above a second pressure threshold;
        receive a second pressure measurement from the pressure sensor in response to determining that the mechanical switch is not tripped;
        determine whether the second pressure measurement is less than the set-point minus an offset in response to determining that the mechanical switch is not tripped; and
        allow the compressor to turn on in response to determining the second pressure measurement is less than the set-point minus the offset.

10. The pressure control device of claim 1, wherein the processing circuit is configured to:
  determine whether the pressure control device is in a manual or auto reset mode; and
  in response to determining that the pressure control device is in a manual reset mode:
    determine whether a user has requested a reset via a user interface;
    determine whether the mechanical switch is tripped in response to determining that the user has requested the reset;
    receive a second pressure measurement from the pressure sensor in response to determining that the mechanical switch is not tripped and that the user has requested the reset;
    determine whether the second pressure measurement is less than the set-point minus an offset in response to determining that the mechanical switch is not tripped and that the user has requested the reset; and
    turn the compressor on in response to determining the second pressure measurement is less than the set-point minus the offset.

11. The pressure control device of claim 1, further comprising a power relay configured to control a supply of power to the compressor;
  wherein the movement of the mechanical switch into the open position or the closed position actuates the power relay and interrupts the supply of power to the compressor.

12. The pressure control device of claim 11, wherein the mechanical switch comprises a first switch terminal and a second switch terminal, wherein the first switch terminal is connected to a relay output of the processing circuit and the second switch terminal is connected to a first relay terminal of the power relay;
  wherein the power relay comprises the first relay terminal and a second relay terminal, wherein the second relay terminal is grounded;
  wherein the processing circuit is configured to control the compressor based on the set-point and the measured pressure by turning the compressor on or off by setting the relay output to a high voltage or a low voltage, wherein when the mechanical switch is in the closed position and the relay output is set to the high voltage, current flows through the mechanical switch and the power relay allowing the compressor to turn on.

13. The pressure control device of claim 11, wherein the mechanical switch comprises a first switch terminal and a second switch terminal, wherein the first switch terminal is grounded and the second switch terminal is connected to a first relay terminal of the power relay;
  wherein the power relay comprises the first relay terminal and a second relay terminal, wherein the second relay terminal is connected to a relay output of the processing circuit;
  wherein the processing circuit is configured to control the compressor based on the set-point and the pressure by turning the compressor on or off by setting the relay output to a high voltage or a low voltage, wherein when the mechanical switch is in the closed position and the relay output is set to the high voltage, current flows through the mechanical switch and the power relay allowing the compressor to turn on.

14. The pressure control device of claim 6, wherein the mechanical switch is configured to move into the open position or the closed position in response to the pressure of the pressure line exceeding a pressure threshold, thereby causing the compressor to turn off when the pressure of the pressure line exceeds the pressure threshold.

15. The pressure control device of claim 6, wherein the mechanical switch is configured to move into the open position or the closed position in response to the pressure of the pressure line being below a pressure threshold, thereby causing the compressor to turn on or turn off when the pressure of the pressure line is below the pressure threshold.

16. The pressure control device of claim 6, wherein the processing circuit is configured to:
  determine whether the pressure of the pressure line exceeds a pressure threshold;
  determine whether the mechanical switch has moved into the open position or the closed position; and
  turn off the compressor in response to determining that the pressure of the pressure line exceeds the pressure threshold when the mechanical switch has failed to turn off the compressor.

17. The pressure control device of claim 7, further comprising a pressure connector that connects the mechanical switch and the pressure sensor to the pressure line, wherein the pressure sensor is configured to measure the pressure of the pressure line via the pressure connector.

18. The pressure control device of claim 7, wherein the mechanical switch is configured to move into the open position or the closed position in response to the pressure of the pressure line exceeding a pressure threshold, thereby causing the compressor to turn off when the pressure of the pressure line exceeds the pressure threshold.

19. The pressure control device of claim 7, wherein the mechanical switch is configured to move into the open position or the closed position in response to the pressure of the pressure line being below a pressure threshold, thereby causing the compressor to turn on or turn off when the pressure of the pressure line is below the pressure threshold.

20. The pressure control device of claim 7, wherein the processing circuit is configured to:
  determine whether the pressure of the pressure line exceeds a pressure threshold;
  determine whether the mechanical switch has moved into the open position or the closed position; and
  turn off the compressor in response to determining that the pressure of the pressure line exceeds the pressure threshold when the mechanical switch has failed to turn off the compressor.

* * * * *